(12) United States Patent
Muthiah et al.

(10) Patent No.: US 10,331,555 B1
(45) Date of Patent: Jun. 25, 2019

(54) DYNAMIC MEMORY COMPACTION

(71) Applicant: Western Digital Technologies, Inc., San Jose, CA (US)

(72) Inventors: Ramanathan Muthiah, Bangalore (IN); Ramkumar Ramamurthy, Bangalore (IN); Balaji Thraksha Venkataramanan, Bangalore (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 15/913,914

(22) Filed: Mar. 6, 2018

(51) Int. Cl.
*G06F 12/02* (2006.01)
*G06F 3/06* (2006.01)

(52) U.S. Cl.
CPC .......... *G06F 12/0253* (2013.01); *G06F 3/064* (2013.01); *G06F 3/0656* (2013.01); *G06F 3/0679* (2013.01); *G06F 12/0246* (2013.01); *G06F 2212/7205* (2013.01)

(58) Field of Classification Search
None
See application file for complete search history.

(56) References Cited

U.S. PATENT DOCUMENTS

| | | | |
|---|---|---|---|
| 7,444,462 B2 | 10/2008 | Traister et al. | |
| 8,463,826 B2 | 6/2013 | Post et al. | |
| 8,725,931 B1* | 5/2014 | Kang | G06F 12/0246 710/52 |
| 9,477,413 B2 | 10/2016 | Phan | |
| 9,606,733 B2 | 3/2017 | Chiu | |
| 2009/0198946 A1* | 8/2009 | Ebata | G06F 3/0608 711/171 |
| 2011/0149650 A1* | 6/2011 | Huang | G06F 12/0246 365/185.03 |
| 2011/0153912 A1* | 6/2011 | Gorobets | G11C 11/5628 711/103 |
| 2011/0153913 A1* | 6/2011 | Huang | G11C 7/1042 711/103 |
| 2012/0311244 A1* | 12/2012 | Huang | G11C 7/1042 711/103 |
| 2016/0011812 A1* | 1/2016 | Amaki | G06F 3/0625 711/103 |
| 2016/0188220 A1* | 6/2016 | Nemoto | G06F 3/0608 711/103 |
| 2016/0313922 A1* | 10/2016 | Kojima | G06F 3/0605 |
| 2017/0177217 A1* | 6/2017 | Kanno | G06F 12/0246 |
| 2017/0177218 A1* | 6/2017 | Kanno | G06F 3/061 |
| 2017/0351604 A1* | 12/2017 | Tang | G06F 12/0246 |

OTHER PUBLICATIONS

TN-2960: Garbage Collection in SLC NAND Flash Memory, Oct. 15, 2010, Rev. G 4/11 EN, Micron Technology, Inc., Boise, ID, USA.

* cited by examiner

*Primary Examiner* — Kevin Verbrugge
(74) *Attorney, Agent, or Firm* — Kunzler Bean & Adamson, PC

(57) ABSTRACT

Apparatus, systems, methods, and computer program products for dynamic memory compaction are disclosed. A memory device comprises a plurality of memory blocks and a controller for the memory device. A controller is configured to generate an input/output command to write a data chunk to a first memory block of a plurality of memory blocks. A controller is configured to compact an amount of valid data in a second memory block of a plurality of memory blocks based on a size of an I/O command.

21 Claims, 23 Drawing Sheets

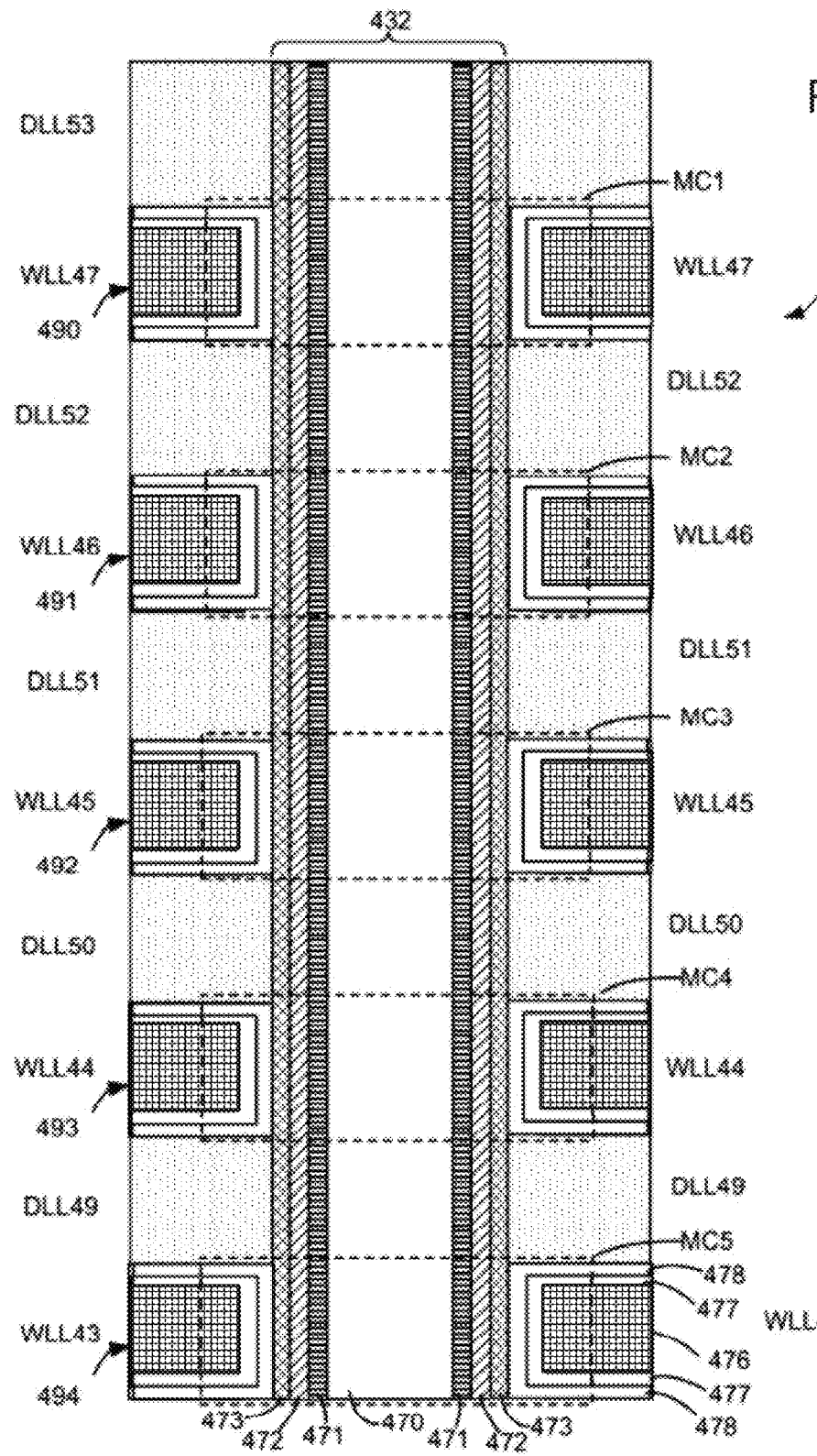

\*\* - Host Data Fragments
$$ - Valid Fragments
- Invalid Fragments

Write DATA to Memory Device(s)

```
*******
*******
```

Controller Write Data Fragments

Controller —Write Command→

Concurrent Data Movement

Fold Buffer(s)

```
$$$$####
####$$$$
$$$$####
####$$$$
$$$$####
####$$$$
$$$$####
####$$$$
```

—Fold Command→

Fold Destination Memory Block(s)

```
$$$$$$$
```

Data moved to Destination Memory Block(s) per Write Command based on size of Write Command and/or Data Chunk in Write Command

FIG. 12B

DYNAMIC MEMORY COMPACTION

TECHNICAL FIELD

The present disclosure, in various embodiments, relates to memory devices and more particularly relates to dynamic compaction for a garbage collection and/or folding process of a memory device.

BACKGROUND

In some memory devices, host data is initially written into single level cell (SLC) blocks. The data from SLC blocks may then be transferred or "folded" into a multi-level cell (MLC) block. The amount of data written by the host may be the amount that is folded as well. This process works well if the data present in the SLC blocks to be folded is all valid or mostly valid. If the number of invalidated data fragments is too high in an SLC block, "compaction" is performed to ensure that invalidated data fragments are not folded to an MLC block, to reduce write amplification or the like.

When a source block is chosen for Garbage collection (GC), compaction may be triggered in phases concurrently with host writes. For example, for every host write command, a compaction phase may be triggered for a fixed amount of time. This fixed amount of time may be predetermined and may be independent of the size of the write command from the host. This means, irrespective of whether the host issues random write commands (e.g., smaller sized data chunks) or sequential writes (e.g., larger sized data chunks), the host may be made to wait for the same amount of time while compaction occurs during a GC process and/or folding process.

SUMMARY

Apparatuses, systems, methods, and computer program products for dynamic memory compaction are disclosed. In one embodiment, a memory device comprises a plurality of memory blocks. A controller for a memory device, in certain embodiments, is configured to generate an input/output (I/O) command to write a data chunk to a first memory block of a plurality of memory blocks. A controller for a memory device, in a further embodiment, is configured to compact an amount of valid data in a second memory block of a plurality of memory blocks based on a size of an I/O command.

In one embodiment, a method includes generating, by a controller, an I/O command to write a data chunk to a first memory block of a plurality of memory blocks in a memory device. A method, in a further embodiment, includes, in response to an I/O command, performing a garbage collection process. At least a compaction portion of a garbage collection process, in certain embodiments, is based on a first size of a data chunk.

In one embodiment, an apparatus includes means for generating an I/O command to write a data chunk to a memory device. An apparatus, in certain embodiments, includes means for determining a size of a data chunk. In a further embodiment, an apparatus includes means for compacting an amount of valid data in a plurality of memory blocks of a memory device based on a size of a data chunk.

In one embodiment, a memory device comprises a plurality of memory blocks. A controller for a memory device, in certain embodiments, is configured to generate an I/O command to write a data chunk to a first memory block of a plurality of memory blocks. A controller for a memory device, in a further embodiment, is configured to write back an amount of valid data stored in a second memory block of the plurality of memory blocks to another memory block of the plurality of memory blocks that only stores valid data based on a size of the data chunk of the I/O command.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which:

FIG. 4 is a schematic block diagram illustrating one embodiment of a three-dimensional (3-D), vertical NAND flash memory structure;

FIGS. 12A and 12B are diagrams illustrating compaction ratios in various embodiments of a folding process with respect to I/O operations;

DETAILED DESCRIPTION

Figure 1A:
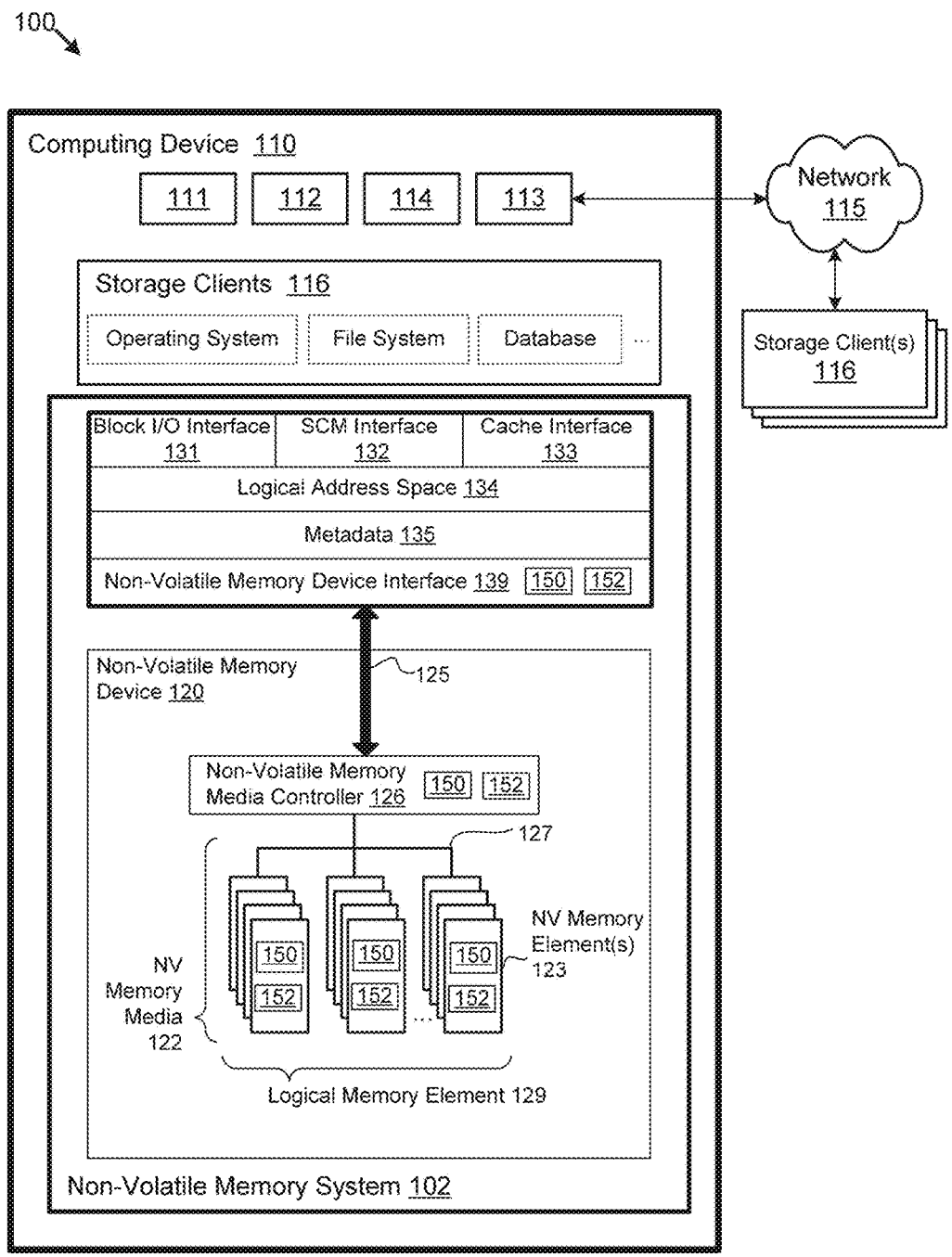
FIG. 1A is a schematic block diagram illustrating one embodiment of a system providing dynamic compaction for a garbage collection and/or folding process.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer-readable storage media storing computer-readable and/or executable program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer-readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

FIG. 1A is a block diagram of one embodiment of a system 100 comprising a garbage collection (GC) component 150 and/or a folding component 152 for a controller 126 of a non-volatile memory device 120. The GC component 150 and/or folding component 152 may be part of and/or in communication with a controller 126, a non-volatile memory element 123, a device driver, or the like. The GC component 150 and/or folding component 152 may operate on a non-volatile memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 and/or controller 126 to a communication network 115, such as an Internet Protocol (IP) network, a Storage Area Network (SAN), wireless network, wired network, or the like.

The non-volatile memory device 120, in various embodiments, may be disposed in one or more different locations relative to the computing device 110. In one embodiment, the non-volatile memory device 120 comprises one or more non-volatile memory elements 123, such as semiconductor chips or packages or other integrated circuit devices disposed on one or more printed circuit boards, storage housings, and/or other mechanical and/or electrical support structures. For example, the non-volatile memory device 120 may comprise one or more direct inline memory module (DIMM) cards, one or more expansion cards and/or daughter cards, a solid-state-drive (SSD) or other hard drive device, and/or may have another memory and/or storage form factor. The non-volatile memory device 120 may be integrated with and/or mounted on a motherboard of the computing device 110, installed in a port and/or slot of the computing device 110, installed on a different computing device 110 and/or a dedicated storage appliance on the network 115, in communication with the computing device 110 over an external bus (e.g., an external hard drive), or the like.

The non-volatile memory device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the non-volatile memory device 120 may be disposed on a peripheral bus of the computing device 110, such as a peripheral component interconnect express (PCI Express or PCIe) bus, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the non-volatile memory device 120 may be disposed on a data network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The computing device 110 may further comprise a non-transitory, computer-readable storage medium 114. The computer-readable storage medium 114 may comprise executable instructions configured to cause the computing device 110 (e.g., processor 111) to perform steps of one or more of the methods disclosed herein. Alternatively, or in addition, the GC component 150 may be embodied as one or more computer-readable instructions stored on the non-transitory storage medium 114.

Compaction is a process of de-fragmentation in which valid data fragments in an SLC block are written back to a newer SLC block, to an MLC block, or the like with only other valid data fragments. Thus, the data may first be compacted to a new SLC block and then folded to an MLC block, which may help performance when it comes to SLC/MLC compaction in the future.

Data movement may be followed by flash translation layer (FTL) entry additions for tracking the location of moved data. Hence, latency for a compaction process may be the sum of the latency of actual compaction and the latency for the FTL entry additions for the data that is moved. The time required to complete the compaction and FTL entry additions for a given block may be based on the number of valid data fragments in the block. If the quantity of valid data fragments (or valid data) is high (e.g., greater than 50%, or the like) for an SLC block, the data stored therein may also be folded.

The non-volatile memory system 102, in some embodiments, includes a GC component 150. The GC component 150, in one embodiment, is configured to dynamically compact valid data and/or valid data fragments to facilitate GC operations performed by a controller, as described below. The GC component 150, in certain embodiments, may receive a notification that the controller is going to perform a write command/operation and the size of the write command and/or the size of a data chunk included in the write command/operation. The GC component 150, in response to the notification, may identify and/or calculate an amount of valid data and/or valid data fragments in one or more source memory blocks (e.g., one or more single-level cell (SLC) block and/or one or more multi-level cell (MLC) blocks) based on the size of the write command and/or the size of a data chunk included in the write command. The GC component 150 may further write the amount of valid data and/or valid data fragments to a buffer (e.g., the buffer of the controller). In additional or alternative embodiments, the GC component 150 may identify and/or calculate an amount of valid data and/or valid data fragments in the buffer based on the size of the write command and write the amount of valid data and/or valid data fragments to one or more respective destination memory blocks (e.g. one or more SLC blocks and/or one or more MLC blocks). In further additional or alternative embodiments, the GC component 150 may identify and/or calculate the validity ratio of data in one or more memory elements 123 of the non-volatile memory media 122 (e.g., flash element(s)) by determining the number of valid data fragments compared to the total number of data fragments in one or more source memory blocks. Thus, the GC component 150 may dynamically compact valid data and/or valid data fragments for facilitating performance of a GC process and/or GC operations by a controller.

The non-volatile memory system 102, in additional or alternative embodiments, includes a folding component 152. The folding component 152, in one embodiment, is configured to dynamically compact valid data and/or valid data fragments to facilitate folding operations performed by a controller, as described below. The folding component 152, in certain embodiments, may receive a notification that the controller is going to perform a write command/operation and the size of the write command and/or the size of a data chunk included in the write command/operation. The folding component 152, in response to the notification, may identify and/or calculate an amount of valid data and/or valid data fragments in one or more source memory blocks (e.g., one or more SLC blocks) based on the size of the write command and/or the size of a data chunk included in the write command. The folding component 152 may further write the amount of valid data and/or valid data fragments to a buffer (e.g., the buffer of the controller). In additional or alternative embodiments, the folding component 152 may identify and/or calculate an amount of valid data and/or valid data fragments in the buffer based on the size of the write command and write the amount of valid data and/or valid data fragments to one or more destination memory blocks (e.g., one or more MLC blocks). In further additional or alternative embodiments, the folding component 152 may identify and/or calculate the validity ratio of data in one or more memory elements 123 of the non-volatile memory media 122 (e.g., flash element(s)) by determining the number of valid data fragments compared to the total number of data fragments in one or more destination memory blocks. Thus, the folding component 152 may dynamically compact valid data and/or valid data fragments for facilitating performance of a folding process and/or GC operations by a controller.

In various embodiments, the GC component 150 and/or folding component 152 may comprise logic hardware of one or more non-volatile memory devices 120, such as a controller 126, a non-volatile memory element 123, a device controller, a field-programmable gate array (FPGA) or other programmable logic, firmware for an FPGA or other programmable logic, microcode for execution on a microcontroller, an application-specific integrated circuit (ASIC), or the like. In other embodiments, the GC component 150 may comprise executable software code, such as a device driver or the like, stored on the computer-readable storage medium 114 for execution on the processor 111. In further embodiments, the GC component 150 and/or folding component 152 may include a combination of both executable software code and logic hardware.

In various embodiments, the GC component 150 and/or folding component 152 is/are configured to receive I/O requests from a device driver or other executable application via a bus 125 or the like. The GC component 150 and/or folding component 152 may be further configured to transfer data to/from a device driver and/or storage clients 116 via the bus 125. Accordingly, the GC component 150 and/or folding component 152, in various embodiments, may comprise and/or be in communication with one or more direct memory access (DMA) modules, remote DMA modules, bus controllers, bridges, buffers, and so on to facilitate the transfer of storage requests and associated data. In other embodiments, the GC component 150 and/or folding component 152 may receive storage requests as an API call from a storage client 116, as an IO-CTL command, or the like.

According to various embodiments, a controller 126 in communication with one or more GC components 150 and/or one or more folding components 152 may manage one or more non-volatile memory devices 120 and/or non-volatile memory elements 123. The non-volatile memory device(s) 120 may comprise recording, memory, and/or storage devices, such as solid-state storage device(s) and/or semiconductor storage device(s) that are arranged and/or partitioned into a plurality of addressable media storage locations. As used herein, a media storage location refers to any physical unit of memory (e.g., any quantity of physical storage media on a non-volatile memory device 120). Memory units may include, but are not limited to: pages, memory divisions, blocks, sectors, collections or sets of physical storage locations (e.g., logical pages, logical blocks), or the like.

A device driver and/or the controller 126, in certain embodiments, may present a logical address space 134 to the storage clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the non-volatile memory device 120 may maintain metadata 135, such as a logical to physical address mapping structure, to map logical addresses of the logical address space 134 to media storage locations on the non-volatile memory device(s) 120. A device driver may be configured to provide storage services to one or more storage clients 116. The storage clients 116 may include local storage clients 116 operating on the computing device 110 and/or remote, storage clients 116 accessible via the network 115 and/or network interface 113. The storage clients 116 may include, but are not limited to: operating systems, file systems, database applications, server applications, kernel-level processes, user-level processes, applications, and the like.

A device driver may be communicatively coupled to one or more non-volatile memory devices 120. The one or more non-volatile memory devices 120 may include different types of non-volatile memory devices including, but not limited to: solid-state storage devices, semiconductor storage devices, SAN storage resources, or the like. The one or more non-volatile memory devices 120 may comprise one or more respective controllers 126 and non-volatile memory media 122. A device driver may provide access to the one or more non-volatile memory devices 120 via a traditional block I/O interface 131. Additionally, a device driver may provide access to enhanced functionality through the SCM interface 132. The metadata 135 may be used to manage and/or track data operations performed through any of the Block I/O interface 131, SCM interface 132, cache interface 133, or other, related interfaces.

The cache interface 133 may expose cache-specific features accessible via a device driver for the non-volatile memory device 120. Also, in some embodiments, the SCM interface 132 presented to the storage clients 116 provides access to data transformations implemented by the one or more non-volatile memory devices 120 and/or the one or more controllers 126.

A device driver may present a logical address space 134 to the storage clients 116 through one or more interfaces. As discussed above, the logical address space 134 may comprise a plurality of logical addresses, each corresponding to respective media locations of the one or more non-volatile memory devices 120. A device driver may maintain metadata 135 comprising any-to-any mappings between logical addresses and media locations, or the like.

A device driver may further comprise and/or be in communication with a non-volatile memory device interface 139 configured to transfer data, commands, and/or queries to the one or more non-volatile memory devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The non-volatile memory device interface 139 may communicate with the one or more non-volatile memory devices 120 using input-output control (IO-CTL) command(s), IO-CTL command extension(s), remote direct memory access, or the like.

The communication interface 113 may comprise one or more network interfaces configured to communicatively couple the computing device 110 and/or the controller 126 to a network 115 and/or to one or more remote, network-accessible storage clients 116. The storage clients 116 may include local storage clients 116 operating on the computing device 110 and/or remote, storage clients 116 accessible via the network 115 and/or the network interface 113. The controller 126 is part of and/or in communication with one or more non-volatile memory devices 120. Although FIG. 1A depicts a single non-volatile memory device 120, the disclosure is not limited in this regard and could be adapted to incorporate any number of non-volatile memory devices 120.

The non-volatile memory device 120 may comprise one or more elements 123 of non-volatile memory media 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more elements 123 of non-volatile memory media 122, in certain embodiments, comprise storage class memory (SCM) (e.g., write in place memory, or the like).

While legacy technologies such as NAND flash may be block and/or page addressable, storage class memory, in one embodiment, is byte addressable (e.g., byte addressable for read, program/write, and/or erase operations; capable of byte addressable write in place operations without an erase operation; or the like). In further embodiments, storage class memory may be faster and/or have a longer life (e.g., endurance) than NAND flash; may have a lower cost, use less power, and/or have a higher storage density than DRAM; or offer one or more other benefits or improvements when compared to other technologies. For example, storage class memory may comprise one or more non-volatile memory elements 123 of ReRAM, Memristor memory, programmable metallization cell memory, phase-change memory, nano RAM, nanocrystal wire-based memory, silicon-oxide based sub-10 nanometer process memory, graphene memory, SONOS memory, PMC memory, CBRAM, MRAM, and/or variations thereof.

While the non-volatile memory media 122 is referred to herein as "memory media," in various embodiments, the non-volatile memory media 122 may more generally comprise one or more non-volatile recording media capable of recording data, which may be referred to as a non-volatile memory medium, a non-volatile storage medium, or the like. Further, the non-volatile memory device 120, in various embodiments, may comprise a non-volatile recording device, a non-volatile memory device, a non-volatile storage device, or the like.

The non-volatile memory media 122 may comprise one or more non-volatile memory elements 123, which may include, but are not limited to: chips, packages, planes, die, or the like. A controller 126 may be configured to manage data operations on the non-volatile memory media 122, and may comprise one or more processors, programmable processors (e.g., FPGAs), ASICs, micro-controllers, or the like. In some embodiments, the controller 126 is configured to store data on and/or read data from the non-volatile memory media 122, to transfer data to/from the non-volatile memory device 120, and so on.

The controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the controller 126 in parallel. This parallel access may allow the non-volatile memory elements 123 to be managed as a group, forming a logical memory element 129. The logical memory element may be partitioned into respective logical memory units (e.g., logical pages) and/or logical memory divisions (e.g., logical blocks). The logical memory units may be formed by logically combining physical memory units of each of the non-volatile memory elements.

The controller 126 may organize a block of word lines within a non-volatile memory element 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory element 123 may be physically arranged in a monotonically increasing sequence of word line addresses, with consecutively addressed word lines also being physically adjacent (e.g., WL0, WL1, WL2, . . . WLN).

The controller 126 may comprise and/or be in communication with a device driver executing on the computing device 110. A device driver may provide storage services to the storage clients 116 via one or more interfaces 131, 132, and/or 133. In some embodiments, a device driver provides a block-device I/O interface 131 through which storage clients 116 perform block-level I/O operations. Alternatively, or in addition, a device driver may provide a storage class memory (SCM) interface 132, which may provide other storage services to the storage clients 116. In some embodiments, the SCM interface 132 may comprise extensions to the block device interface 131 (e.g., storage clients 116 may access the SCM interface 132 through extensions or additions to the block device interface 131). Alternatively, or in addition, the SCM interface 132 may be provided as a separate API, service, and/or library. A device driver may be further configured to provide a cache interface 133 for caching data using the non-volatile memory system 102. A device driver may further comprise a non-volatile memory device interface 139 that is configured to transfer data, commands, and/or queries to the controller 126 over a bus 125, as described above.

Figure 1B:
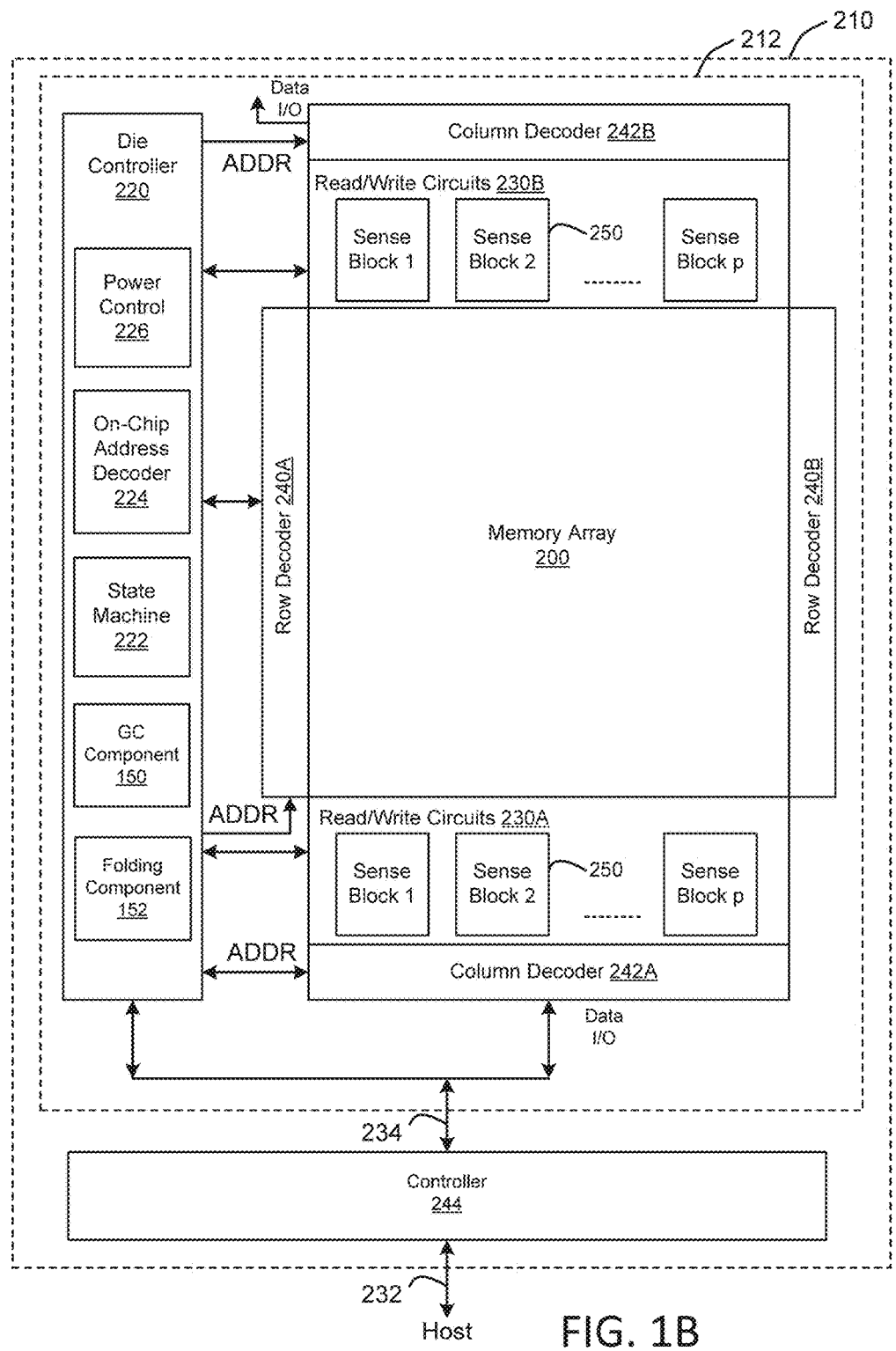
FIG. 1B is a schematic block diagram illustrating another embodiment of a system providing dynamic compaction for a garbage collection and/or folding process.

FIG. 1B illustrates an embodiment of a non-volatile storage device 210 that may include one or more memory die or chips 212. Memory die 212, in some embodiments, includes an array (two-dimensional or three dimensional) of memory cells 200, die controller 220, and read/write circuits 230A/230B. In one embodiment, access to the memory array 200 by the various peripheral circuits is implemented in a symmetric fashion, on opposite sides of the array, so that the densities of access lines and circuitry on each side are reduced by half. The read/write circuits 230A/230B, in a further embodiment, include multiple sense blocks 250 which allow a page of memory cells to be read or programmed in parallel.

The memory array 200, in various embodiments, is addressable by word lines via row decoders 240A/240B and by bit lines via column decoders 242A/242B. In some embodiments, a controller 244 is included in the same memory device 210 (e.g., a removable storage card or package) as the one or more memory die 212. Commands and data are transferred between the host and controller 244 via lines 232 and between the controller and the one or more memory die 212 via lines 234. One implementation may include multiple chips 212.

Die controller 220, in one embodiment, cooperates with the read/write circuits 230A/230B to perform memory operations on the memory array 200. The die controller 220, in various embodiments, includes a GC component 150 and/or a folding component 152, a state machine 222, and an on-chip address decoder 224. In one embodiment, the state machine 222 comprises at least a portion of the GC component 150 and/or at least a portion of the folding component 152. In further embodiments, the controller 244 comprises at least a portion of the GC component 150 and/or at least a portion of the folding component 152. In various embodiments, one or more of the sense blocks 250 comprises at least a portion of the GC component 150 and/or at least a portion of the folding component 152.

The GC component 150, in one embodiment, is configured to identify a failure of a memory device during a multi-plane operation. In additional or alternative embodiments, the GC component 150 is configured to perform an erase operation on one or more planes of the memory device and/or perform a program operation on one or more successfully erased planes of the memory device.

The state machine 222, in one embodiment, provides chip-level control of memory operations. The on-chip address decoder 224 provides an address interface to convert between the address that is used by the host or a memory controller to the hardware address used by the decoders 240A, 240B, 242A, and 242B. In certain embodiments, the state machine 222 includes an embodiment of the GC component 150. The GC component 150, in certain embodiments, is embodied as software in a device driver, hardware in a controller 244, and/or hardware in a die controller 220 and/or state machine 222.

In one embodiment, one or any combination of die controller 220, GC component 150, decoder circuit 224, state machine circuit 222, decoder circuit 242A, decoder circuit 242B, decoder circuit 240A, decoder circuit 240B, read/write circuits 230A, read/write circuits 230B, and/or controller 244 may be referred to as one or more managing circuits.

Figure 2:
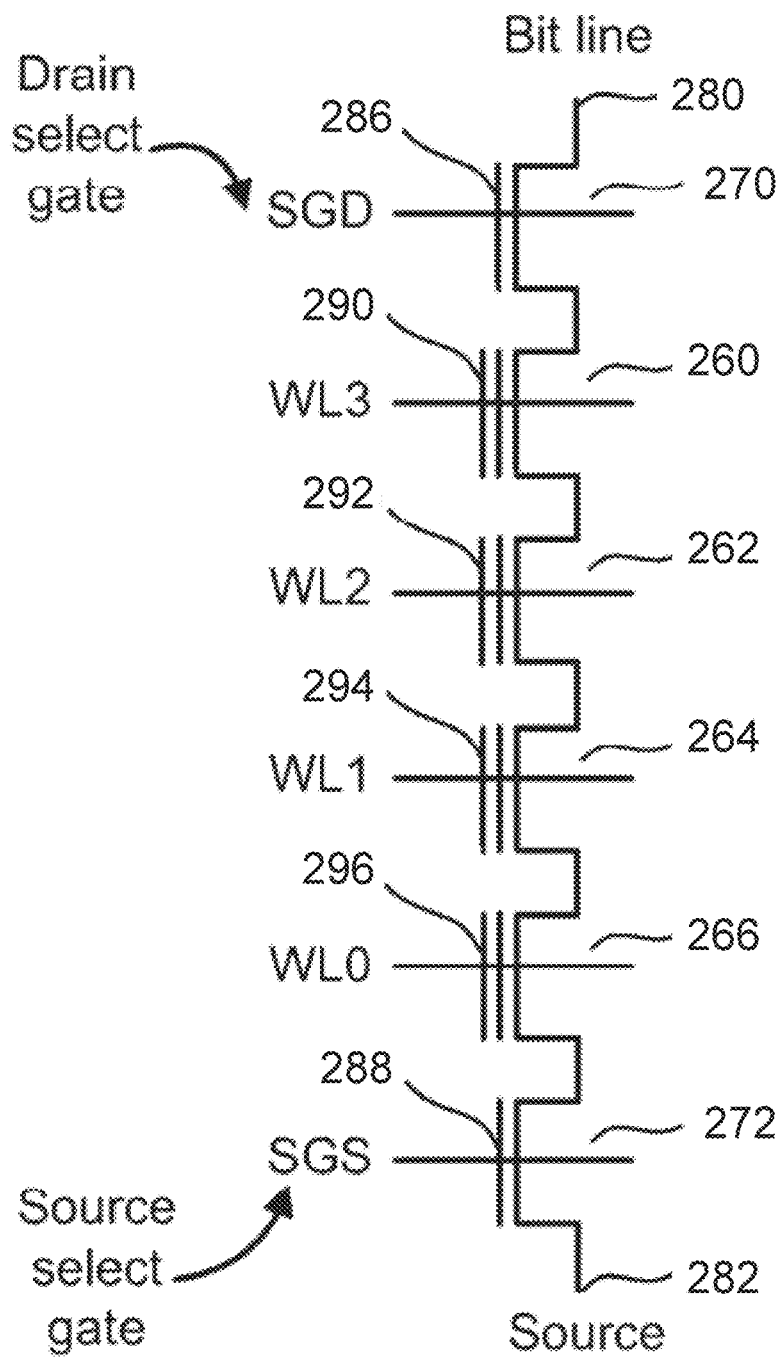
FIG. 2 is a schematic block diagram illustrating one embodiment of a string of storage cells.

FIG. 2 depicts one embodiment of a NAND string comprising a plurality of storage elements. The NAND string depicted in FIG. 2, in some embodiments, includes four transistors 260, 262, 264, and 266 connected in series and located between a first select transistor 270 and a second select transistor 272. In some embodiments, a transistor 260, 262, 264, and 266 includes a control gate and a floating gate. A control gate 290, 292, 294, 2 and 96, in one embodiment, is connected to, or comprises a portion of, a word line. In a further embodiment, a transistor 260, 262, 264, and 266 is a storage element, storage cell, or the like, also referred to as a memory cell. In some embodiments, a storage element may include multiple transistors 260, 262, 264, and 266.

The first select transistor 270, in some embodiments, gates/connects the NAND string connection to a bit line 280 via a drain select gate SGD. The second select transistor 272, in certain embodiments, gates/connects the NAND string connection to a source line 282 via a source select gate SGS. The first select transistor 270, in a further embodiment, is controlled by applying a voltage to a corresponding select gate 286. The second select transistor 272, in some embodiments, is controlled by applying a voltage to corresponding select gate 288.

As shown in FIG. 2, the source line 282, in one embodiment, is connected to the sources of each transistor/storage cell 260, 262, 264, and 266 in the NAND string. The NAND string, in some embodiments, may include some storage elements 260, 262, 264, and 266 that have been programmed and some storage elements 260, 262, 264, and 266 that have not been programmed. As described in more detail below, the GC component 150 and/or folding component 152 controls whether portions of a storage device, such as a NAND string, are used for GC operations and/or folding operations, respectively.

Figure 3:
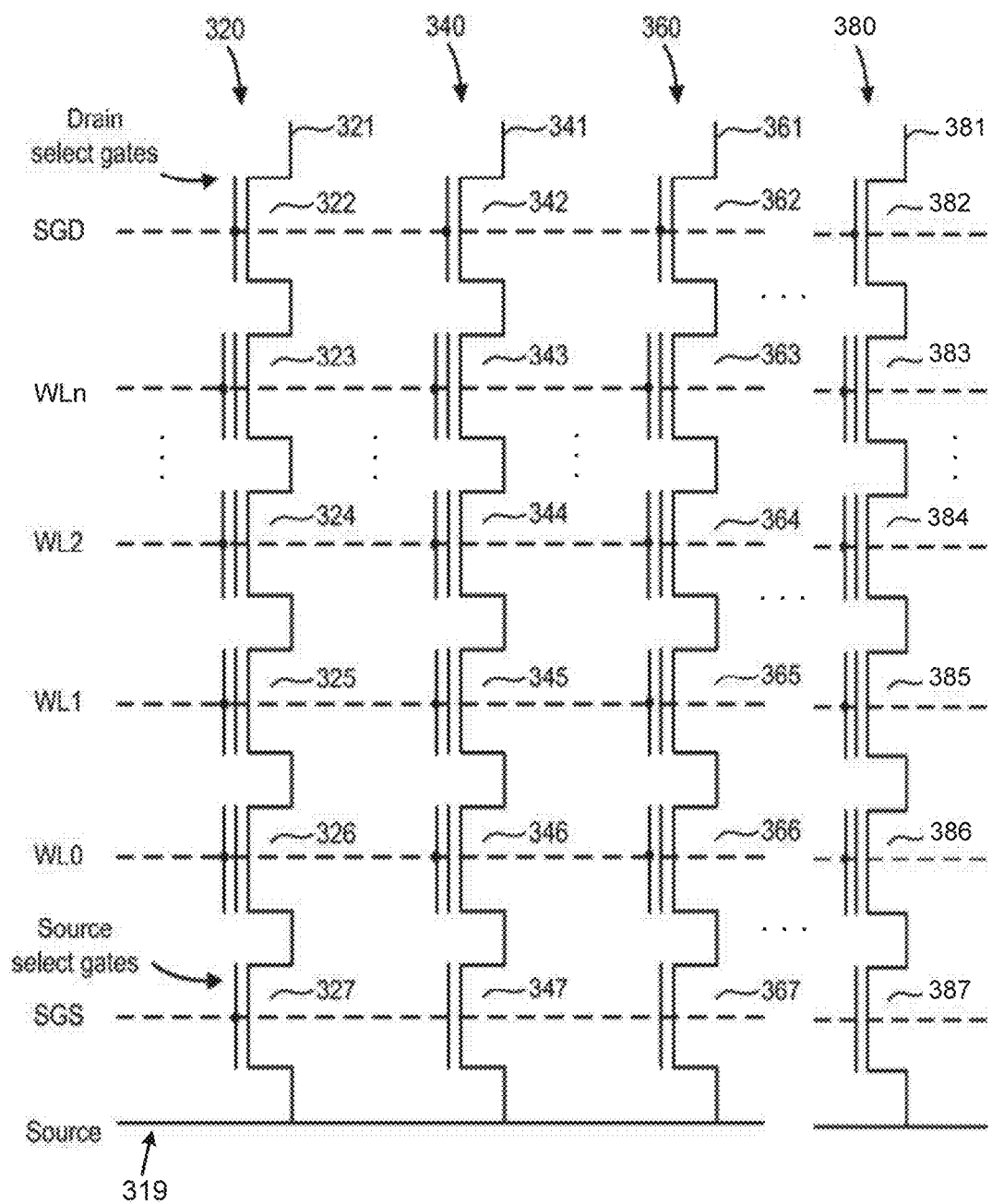
FIG. 3 is a schematic block diagram illustrating one embodiment of an array of storage cells.

FIG. 3 is a circuit diagram depicting a plurality of NAND strings 320, 340, 360, and 380. The architecture for a flash memory system using a NAND structure may include several NAND strings 320, 340, 360, and 380. For example, FIG. 3 illustrates NAND strings 320, 340, 360, and 380 in a memory array 200 that includes multiple NAND strings 320, 340, 360, and 380. In the depicted embodiment, each NAND string 320, 340, 360, and 380 includes drain select transistors 322, 342, 362, and 382, source select transistors 327, 347, 367, and 387, and storage elements 323-326, 343-346, 363-366, and 383-386. While four storage elements 323-326, 343-346, 363-366, and 383-386 per NAND string 320, 340, 360, and 380 are illustrated for simplicity, some NAND strings 320, 340, 360, and 380 may include any number of storage elements, e.g., thirty-two, sixty-four, or the like storage elements.

NAND strings 320, 340, 360, and 380, in one embodiment, are connected to a source line 319 by source select transistors 327, 347, 367, 387. A selection line SGS may be used to control the source side select transistors. The various NAND strings 320, 340, 360, and 380, in one embodiment, are connected to bit lines 321, 341, 361, 381 by drain select transistors 322, 342, 362, and 382. The drain select transistors 322, 342, 362, and 382 may be controlled by a drain select line SGD. In some embodiments, the select lines do not necessarily need to be in common among the NAND strings 320, 340, 360, and 380; that is, different select lines may be provided for different NAND strings 320, 340, 360, and 380.

As described above, each word line WL0-WLn comprises one or more storage elements 323-383, 324-384, 325-385, and 326-386. In the depicted embodiment, each bit line 321, 341, 361, 381 and the respective NAND string 320, 340, 360, and 380 comprise the columns of the memory array 200, storage block, erase block, or the like. The word lines WL0-WLn, in some embodiments, comprise the rows of the memory array 200, storage block, erase block, or the like. Each word line WL0-WLn, in some embodiments, connects the control gates of each storage element 323-383, 324-384, 325-385, and 326-386 in a row. Alternatively, the control gates may be provided by the word lines WL0-WLn themselves. In some embodiments, a word line WL0-WLn may include tens, hundreds, thousands, millions, or the like of storage elements 323-383, 324-384, 325-385, and 326-386.

In one embodiment, each storage element 323-326, 343-346, 363-366, and 383-386 is configured to store data. For example, when storing one bit of digital data, the range of possible threshold voltages ("VTH") of each storage element 323-326, 343-346, 363-366, and 383-386 may be divided into two ranges which are assigned logical data "1" and "0." In one example of a NAND type flash memory, the VTH may be negative after the storage elements 323-326, 343-346, 363-366, and 383-386 are erased, and defined as logic "1." In one embodiment, the VTH after a program operation is positive and defined as logic "0."

When the VTH is negative and a read is attempted, in some embodiments, storage elements 323-326, 343-346, 363-366, and 383-386 will turn on to indicate logic "1" is being stored. When the VTH is positive and a read operation is attempted, in a further embodiment, a storage element will not turn on, which indicates that logic "0" is stored. Each storage element 323-383, 324-384, 325-385, and 326-386 may also store multiple levels of information, for example, multiple bits of digital data. In such an embodiment, the range of VTH value is divided into the number of levels of data. For example, if four levels of information may be stored in each storage element 323-326, 343-346, 363-366, and 383-386, there will be four VTH ranges assigned to the data values "11", "10", "01", and "00."

In one example of a NAND type memory, the VTH after an erase operation may be negative and defined as "11." Positive VTH values may be used for the states of "10", "01", and "00." In one embodiment, the specific relationship between the data programmed into the storage elements 323-326, 343-346, 363-366, and 383-386 and the threshold voltage ranges of the storage elements 323-326, 343-346, 363-366, and 383-386 depends upon the data encoding scheme adopted for the storage elements 323-326, 343-346, 363-366, and 383-386.

In some embodiments, portions of the storage elements 323-326, 343-346, 363-366, and 383-386 may be defective. In such an embodiment, the GC component 150 and/or folding component 152 may manage which portions of the storage elements 323-326, 343-346, 363-366, and 383-386 are used for GC operations and/or folding operations, respectively.

FIG. 4 illustrates one embodiment of a cross-sectional view of a 3D, vertical NAND flash memory structure 429 or string 429. In one embodiment, the vertical column 432 is round and includes four layers; however, in other embodiments more or less than four layers may be included and other shapes may be used (e.g., a "U" shape instead of an "I" shape or the like). In one embodiment, a vertical column 432 includes an inner core layer 470 that is made of a dielectric, such as SiO2. Other materials may also be used. Surrounding inner core 470 is polysilicon channel 471. Materials other than polysilicon may also be used. Note that it is the channel 471 that connects to the bit line. Surrounding channel 471 is a tunneling dielectric 472. In one embodiment, tunneling dielectric 472 has an ONO structure. Surrounding tunneling dielectric 472 is a shared charge-trapping layer 473, such as (for example) Silicon Nitride. Other materials and structures may also be used. The technology described herein is not limited to any particular material or structure.

FIG. 4 depicts dielectric layers DLL49, DLL50, DLL51, DLL52 and DLL53, as well as word line layers WLL43, WLL44, WLL45, WLL46, and WLL47. Each of the word line layers includes a word line region 476 surrounded by an aluminum oxide layer 477, which is surrounded by a blocking oxide ($SiO_2$) layer 478. The physical interaction of the word line layers with the vertical column forms the memory cells. Thus, a memory cell, in one embodiment, comprises channel 471, tunneling dielectric 472, charge-trapping layer 473 (e.g., shared with other memory cells), blocking oxide layer 478, aluminum oxide layer 477 and word line region 476. In some embodiments, the blocking oxide layer 478 and aluminum oxide layer 477, may be replaced by a single layer of material with insulating properties or by more than 2 layers of different material with insulating properties. Furthermore, the materials used are not limited to silicon dioxide ($SiO_2$) or aluminum oxide. For example, word line layer WLL47 and a portion of vertical column 432 comprise a memory cell MC1. Word line layer WLL46 and a portion of vertical column 432 comprise a memory cell MC2. Word line layer WLL45 and a portion of vertical column 432 comprise a memory cell MC3. Word line layer WLL44 and a portion of vertical column 432 comprise a memory cell MC4. Word line layer WLL43 and a portion of vertical column 432 comprise a memory cell MC5. In other architectures, a memory cell may have a different structure; however, the memory cell would still be the storage unit.

When a memory cell is programmed, electrons are stored in a portion of the charge-trapping layer 473 that is associated with the memory cell. These electrons are drawn into the charge-trapping layer 473 from the channel 471, through the tunneling dielectric 472, in response to an appropriate voltage on word line region 476. The threshold voltage (Vth) of a memory cell is increased in proportion to the amount of stored charge. In one embodiment, the programming is achieved through Fowler-Nordheim tunneling of the electrons into the charge-trapping layer. During an erase operation, the electrons return to the channel or holes are injected into the charge-trapping layer to recombine with electrons. In one embodiment, erasing is achieved using hole injection into the charge-trapping layer via a physical mechanism such as gate induced drain leakage (GIDL).

Storage cells in the same location or position in different memory structures 429 (e.g., different NAND strings 429) on different bit lines, in certain embodiments, may be on the same word line. Each word line may store one page of data, such as when 1-bit of data is stored per cell (SLC); two pages of data, such as when 2 or more bits of data are stored per cell (MLC); three pages of data, such as when 3-bits of data are stored per cell (TLC); four pages of data, such as when 4-bits of data are stored per cell (QLC); or another number of pages of data. As used herein, MLC may refer to one or more memory cells storing 2 bits per cell, 3 bits per cell, 4 bits per cell, or more (e.g., 2 or more bits per cell).

In the depicted embodiment, a vertical, 3D NAND flash memory structure 429 comprises an "I" shaped memory structure 429. In other embodiments, a vertical, 3D NAND flash memory structure 429 may comprise a "U" shaped structure, or may have another vertical and/or stacked architecture. In certain embodiments, four sets of strings 429 (e.g., four sets of 48 word lines, or another predefined number of word lines) may form an erase block, while in other embodiments, fewer or more than four sets of strings 429 may form an erase block. As may be appreciated, any suitable number of storage cells may be part of a single string 429. In one embodiment, a single string 429 includes 48 storage cells.

Figure 5A:
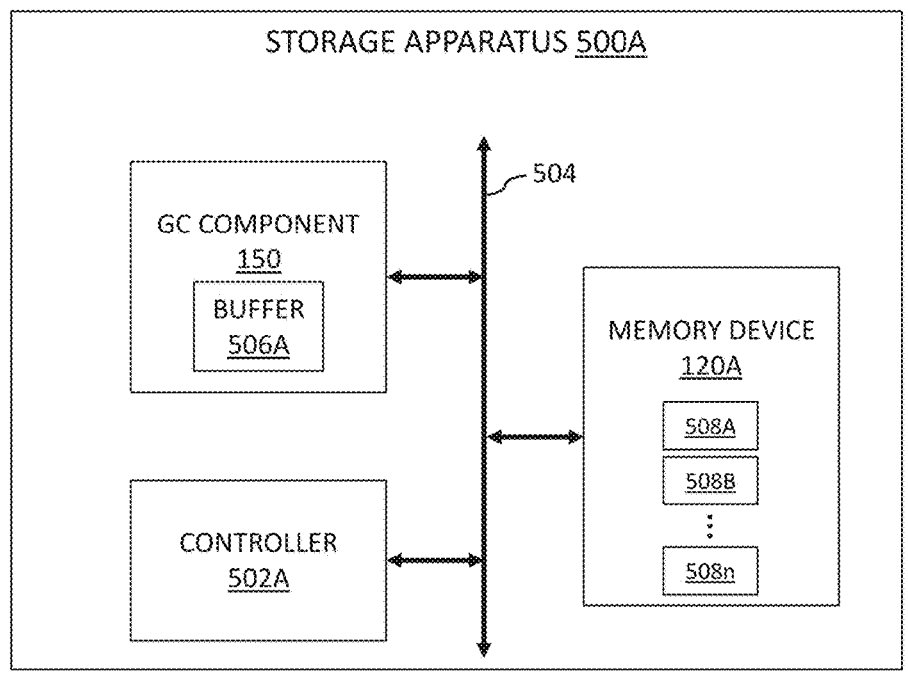
FIGS. 5A through 5D are schematic block diagrams illustrating various embodiments of a storage apparatus that include a garbage collection (GC) component included in the system of FIG. 1A and/or FIG. 1B.

With reference to FIG. 5A, FIG. 5A is a block diagram of one embodiment of a storage apparatus 500A. At least in the illustrated embodiment, the storage apparatus 500A includes, among other components, a GC component 150, a memory device 120A similar to the various embodiments of the memory device 120 discussed elsewhere herein, and a controller 502A coupled to and/or in communication with each other via a bus 504 (e.g., a wired and/or wireless bus).

At least in the illustrated embodiment, the GC component 150 includes, among other components, a buffer 506A. A buffer 506A may include any suitable hardware and/or software that is known or developed in the future that may at least temporarily store computer-useable data. That is, the buffer 506A may store computer-useable data that is written to the buffer 506A from a memory block 508 and may further provide the data stored therein to the same or a different memory block 508 via I/O requests as a portion of a GC process and/or GC operations.

The memory device 120A, at least in the illustrated embodiment, includes a memory block 508A, a memory block 508B, . . . memory block 508n (also simply referred to individually, in various groups, or collectively, as memory block(s) 508) that may be similar to memory elements 123 discussed elsewhere herein. A memory block 508 may include any suitable size that is known or developed in the future that may store computer-usable data and/or code. Further, while the memory device 120A is illustrated as including three memory blocks 508, various other embodiments may include one memory block 508, two memory blocks 508, or any suitable quantity of memory blocks 508 greater than three memory blocks 508.

The memory device 120A, at least in the illustrated embodiment, includes a memory block 508A, a memory block 508B, . . . memory block 508n (also simply referred to individually, in various groups, or collectively, as memory block(s) 508) that may be similar to memory elements 123 discussed elsewhere herein. A memory block 508 may include any suitable size that is known or developed in the future that may store computer-usable data and/or code. Further, while the memory device 120A is illustrated as including three memory blocks 508, various other embodiments may include one memory block 508, two memory blocks 508, or any suitable quantity of memory blocks 508 greater than three memory blocks 508.

A memory block 508 may include any suitable type of memory block and/or memory cell that is known or developed in the future that may store computer-usable data and/or code. In some embodiments, a memory block 508 may include a single level cell (SLC) block, among other types of blocks and/or cells that are possible and contemplated herein.

A controller 502A may include any suitable hardware and/or software that is known or developed in the future that may receive I/O requests (e.g., write requests, read requests, or the like). Further, the controller 502A may, in response to an I/O request, issue and/or generate a corresponding I/O command (e.g., a write command, read command, or the like).

In some embodiments, the controller 502A may determine and/or know the size of a write command that it is generating and/or issuing to the memory block(s) 508. In additional or alternative embodiments, the controller 502A may determine the size of the data (e.g., a data chunk) in a write command that it is generating and/or issuing to the memory block(s) 508. In various embodiments, the controller 502A may notify the GC component 150 of the size of a write command and/or a data chunk included in the write command prior to issuing and/or generating the write command.

The size of a write command and/or a data chunk in the write command may include any suitable size that may enable the data chunk to be written to one or more memory blocks 508. In various embodiments, the write command and/or data chunk may include a size of about 4 KB, 8 KB, 16 KB, or the like, among other sizes that are possible and contemplated herein.

Figure 5B:
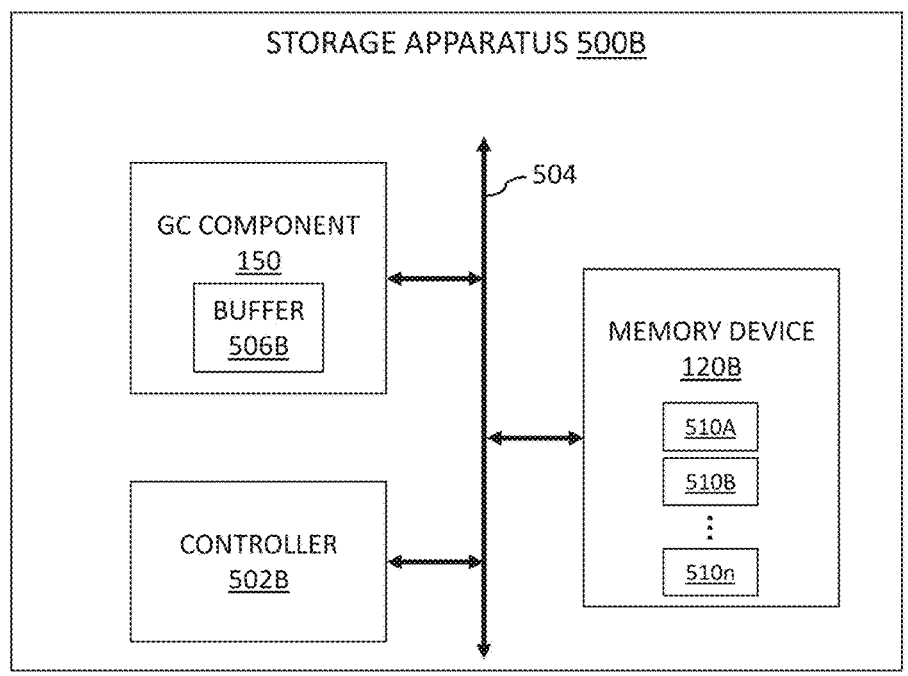

Referring to FIG. 5B, FIG. 5B is a block diagram of another embodiment of a storage apparatus 500B. At least in the illustrated embodiment, the storage apparatus 500B includes, among other components, a GC component 150, a memory device 120B similar to the various embodiments of the memory device 120 discussed elsewhere herein, and a controller 502B coupled to and/or in communication with each other via a bus 504.

At least in the illustrated embodiment, the GC component 150 includes, among other components, a buffer 506B. A buffer 506B may include any suitable hardware and/or software that is known or developed in the future that may at least temporarily store computer-useable data. That is, the buffer 506B may store computer-useable data that is written to the buffer 506B from a memory block 510 and may further provide the data stored therein to the same or a different memory block 510 via I/O requests as a portion of a GC process and/or GC operations.

The memory device 120B, at least in the illustrated embodiment, includes a memory block 510A, a memory block 510B, . . . memory block 510n (also simply referred to individually, in various groups, or collectively, as memory block(s) 510) that may be similar to memory elements 123 discussed elsewhere herein. A memory block 510 may include any suitable size that is known or developed in the future that may store computer-usable data and/or code. Further, while the memory device 120B is illustrated as including three memory blocks 510, various other embodiments may include one memory block 510, two memory blocks 510, or any suitable quantity of memory blocks 510 greater than three memory blocks 508.

A memory block 510 may include any suitable type of memory block and/or memory cell that is known or developed in the future that may store computer-usable data and/or code. In some embodiments, a memory block 510 may include a multi-level cell (MLC) block. An MLC block, as used herein, may include one or more two-level cells, triple-level cells (TLC), quad-level cells (QLC), or the like, among other types of blocks and/or cells that are possible and contemplated herein. That is, while a two-level or double-level cell may be referred to as an MLC, an MLC as used herein may include any quantity of levels greater than one level (e.g., two or more levels) when referenced with respect to a memory block 510.

A controller 502B may include any suitable hardware and/or software that is known or developed in the future that may receive I/O requests (e.g., write requests, read requests, or the like). Further, the controller 502B may, in response to an I/O request, issue and/or generate a corresponding I/O command (e.g., a write command, read command, or the like).

In some embodiments, the controller 502B may determine and/or know the size of a write command that it is generating and/or issuing to the memory block(s) 510. In additional or alternative embodiments, the controller 502B may determine the size of the data (e.g., a data chunk) in a write command that it is generating and/or issuing to the memory block(s) 510. In various embodiments, the controller 502B may notify the GC component 150 of the size of a write command and/or a data chunk included in the write command prior to issuing and/or generating the write command.

The size of a write command and/or a data chunk in the write command may include any suitable size that may enable the data chunk to be written to one or more memory blocks 510. In various embodiments, the write command and/or data chunk may include a size of about 4 KB, 8 KB, 16 KB, or the like, among other sizes that are possible and contemplated herein.

Figure 5C:
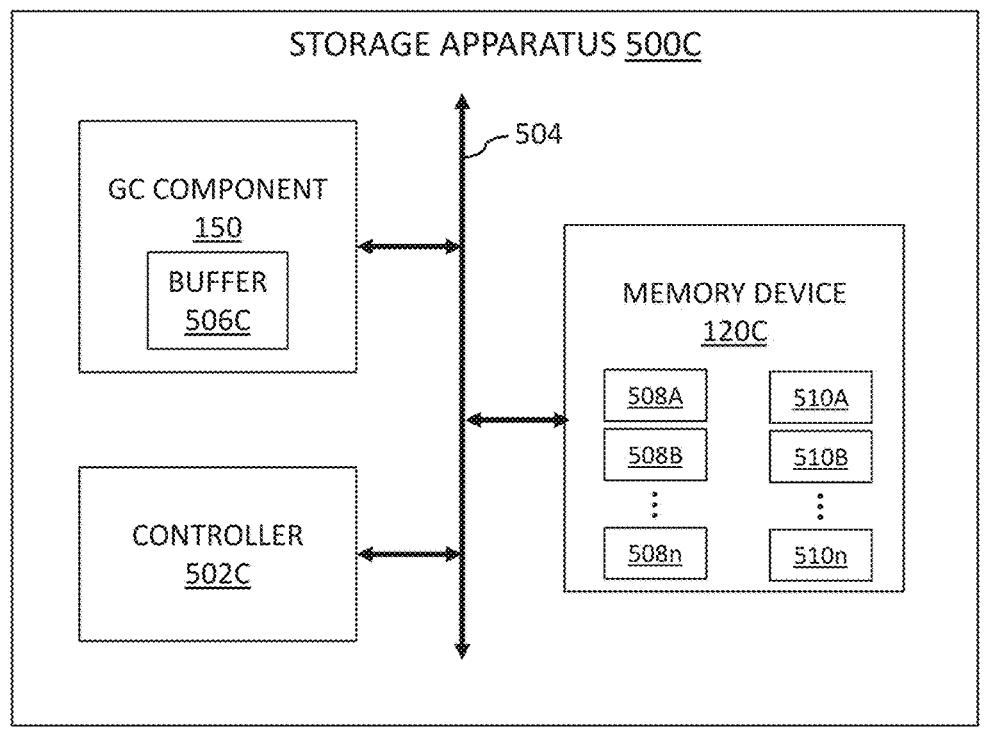

Referring to FIG. 5C, FIG. 5C is a block diagram of yet another embodiment of a storage apparatus 500C. At least in the illustrated embodiment, the storage apparatus 500C includes, among other components, a memory device 120C similar to the various embodiments of the memory device 120 discussed elsewhere herein, a GC component 150, and a controller 502C coupled to and/or in communication with each other via a bus 504.

The memory device 120C, at least in the illustrated embodiment, includes one or more memory blocks 508 similar to the various embodiments discussed elsewhere herein and one or more memory blocks 510. Further, while the memory device 120C is illustrated as including three memory blocks 508 and three memory blocks 510, various other embodiments may include one memory block 508, two memory blocks 508, or any suitable quantity of memory blocks 508 greater than three memory blocks 508. In additional or alternative embodiments, the memory device 120C may include one memory block 510, two memory blocks 510, or any suitable quantity of memory blocks 510 greater than three memory blocks 510.

At least in the illustrated embodiment, the GC component 150 includes, among other components, a buffer 506C, which may include any suitable hardware and/or software that is known or developed in the future that may at least temporarily store computer-useable data. The buffer 506C, in some embodiments, may store computer-useable data that is written to the buffer 506C from a memory block 508 and may further provide the data stored therein to the same or a different memory block 508 via I/O requests as a portion of a GC process and/or GC operations. Further, the buffer 506C may store computer-useable data that is written to the buffer 506C from a memory block 510 and may further provide the data stored therein to the same or a different memory block 510 via I/O requests as another portion of the GC process and/or GC operations.

Figure 5D:
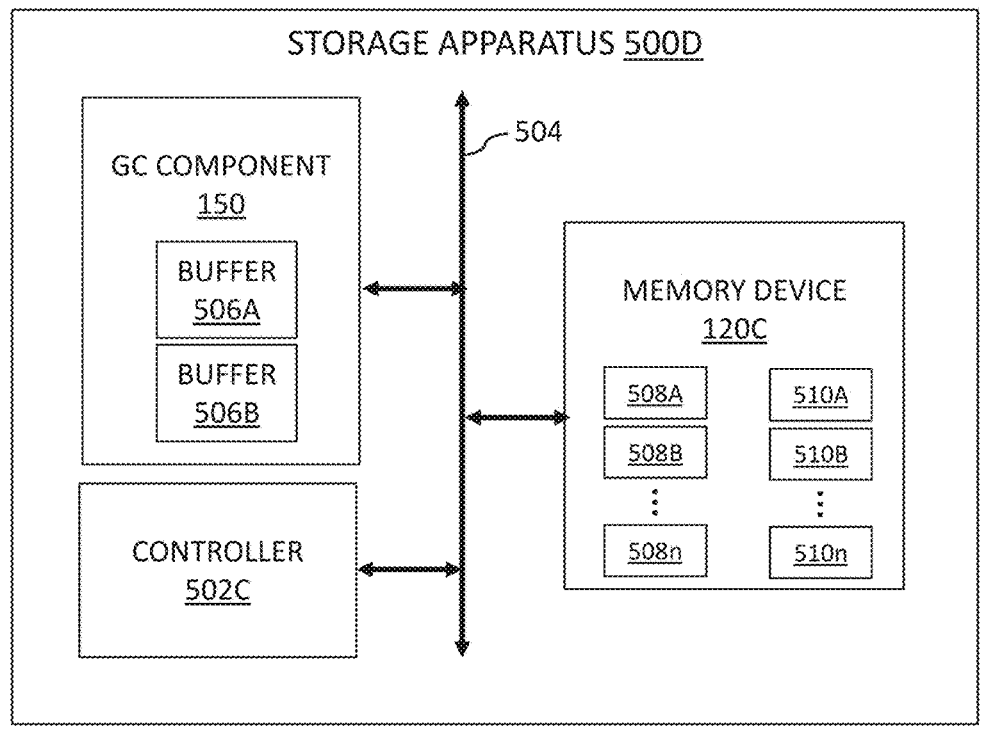

With reference to FIG. 5D, FIG. 5D is a block diagram of still another embodiment of a storage apparatus 500D. At least in the illustrated embodiment, the storage apparatus 500D includes, among other components, a memory device 120C similar to the various embodiments of the memory device 120C discussed elsewhere herein coupled to and/or in communication with a GC component 150.

At least in the illustrated embodiment, the GC component 150 includes, among other components, a buffer 506A similar to the various embodiments discussed elsewhere herein. The GC component 150 further includes a buffer 506B similar to the various embodiments discussed elsewhere herein. That is, the GC component 150 includes separate buffers for storing the data in memory blocks 508 and 510 as part of a GC process and/or GC operations.

A controller 502C may include any suitable hardware and/or software that is known or developed in the future that may receive I/O requests (e.g., write requests, read requests, or the like). Further, the controller 502C may, in response to an I/O request, issue and/or generate a corresponding I/O command (e.g., a write command, read command, or the like).

In some embodiments, the controller 502C may determine and/or know the size of a write command that it is generating and/or issuing to the memory block(s) 508 and the memory block(s) 510. In additional or alternative embodiments, the controller 502C may determine the size of the data (e.g., a data chunk) in a write command that it is generating and/or issuing to the memory block(s) 508 or the memory block(s) 510. In various embodiments, the controller 502C may notify the GC component 150 of the size of a write command and/or a data chunk included in the write command prior to issuing and/or generating the write command.

The size of a write command and/or a data chunk in the write command may include any suitable size that may enable the data chunk to be written to one or more memory blocks 508 or one or more memory blocks 510. In various embodiments, the write command and/or data chunk may include a size of about 4 KB, 8 KB, 16 KB, or the like, among other sizes that are possible and contemplated herein.

Figure 6:
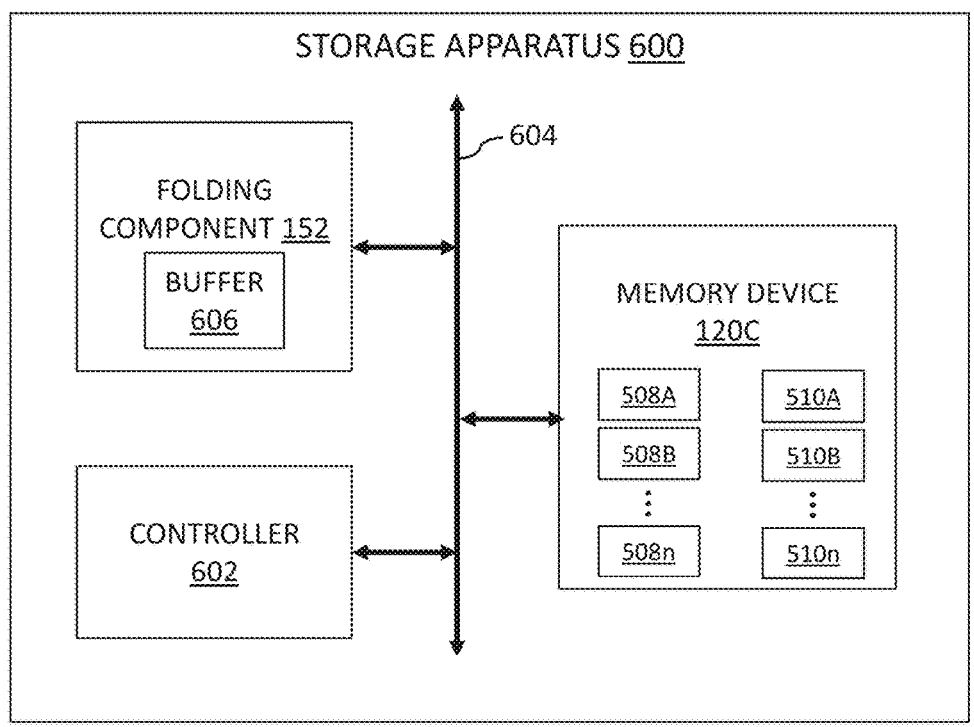
FIG. 6 is a schematic block diagram illustrating one embodiment of a storage apparatus that includes a folding component included in the system of FIG. 1A and/or FIG. 1B.

With reference to FIG. 6, FIG. 6 is a block diagram of another embodiment of a storage apparatus 600. At least in the illustrated embodiment, the storage apparatus 600 includes, among other components, a memory device 120C similar to the various embodiments discussed elsewhere herein, a folding component 152, and a controller 602 coupled to and/or in communication with each other via a bus 604 (e.g., a wired and/or wireless bus).

A folding component 152 may include any suitable hardware and/or software that may perform any folding process and/or folding operations that is known or developed in the future. In various embodiments, a folding component 152 may transfer data from one or more memory blocks 508 to one or more memory blocks 510 to free up storage space in the memory block(s) 508. That is, a folding component 152 may transfer data from an SLC block to an MLC block to, for example, take advantage of the characteristic(s) of the SLC block and MLC block (e.g., the speed of an SLC block and the storage capacity of an MLC block). For example, a folding component 152 may transfer data from one or more single-level cells to one or more two-level cells, one or more TLCs, and/or one or more QLCs, or the like, among other MLCs that may be possible and are contemplated herein.

At least in the illustrated embodiment, the folding component 152 includes, among other components, a buffer 606. The buffer 606 may include any suitable hardware and/or software that is known or developed in the future that may at least temporarily store computer-useable data. That is, the buffer 606 may store computer-useable data that is written to the buffer 606 from a memory block 508 and may further provide the data stored therein to a memory block 510 via I/O requests as a portion of a folding process and/or folding operations.

A controller 602 may include any suitable hardware and/or software that is known or developed in the future that may receive I/O requests (e.g., write requests, read requests, or the like). Further, the controller 602 may, in response to an I/O request, issue and/or generate a corresponding I/O command (e.g., a write command, read command, or the like).

In some embodiments, the controller 602 may determine and/or know the size of a write command that it is generating and/or issuing to the memory block(s) 508. In additional or alternative embodiments, the controller 602 may determine the size of the data (e.g., a data chunk) in a write command that it is generating and/or issuing to the memory block(s) 508. In various embodiments, the controller 602 may notify the folding component 152 of the size of a write command and/or a data chunk included in the write command prior to issuing and/or generating the write command.

The size of a write command and/or a data chunk in the write command may include any suitable size that may enable the data chunk to be written to one or more memory blocks 508. In various embodiments, the write command and/or data chunk may include a size of about 4 KB, 8 KB, 16 KB, or the like, among other sizes that are possible and contemplated herein.

Figure 7A:
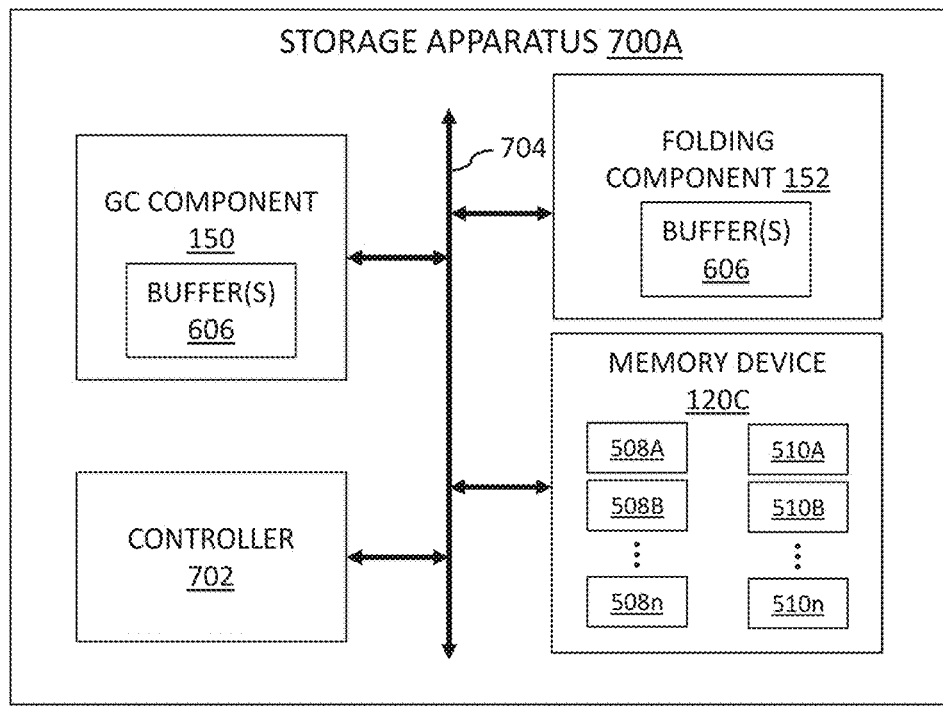
FIGS. 7A and 7B are schematic block diagrams illustrating various embodiments of a storage apparatus that include a GC component and a folding component included in the system of FIG. 1A and/or FIG. 1B.

With reference to FIG. 7A, FIG. 7A is a block diagram of an alternative embodiment of a storage apparatus 700A. At least in the illustrated embodiment, the storage apparatus 700A includes, among other components, a memory device 120C, a GC component 150, a folding component 152, and a controller 702 coupled to and/or in communication with each other via a bus 704 (e.g., a wired and/or wireless bus).

In various embodiments, the GC component 150 includes one or more buffers (e.g., one or more buffers 506A, one or more buffers 506B, and/or one or more buffers 506C (also simply referred to individually, in various groups, or collectively, as buffer(s) 506) and the folding component 152 includes a buffer 606. In some embodiments, a buffer 506 may store data written to it from one or more memory blocks 508 (e.g., an SLC block) as a portion of a GC process and/or GC operations that re-write the data to the same or different memory block 508. In additional or alternative embodiments, a buffer 506 may store data written to it from one or more memory blocks 510 (e.g., an MLC block (e.g., two-level, TLC, QLC, or the like)) as a portion of a GC process and/or GC operations that re-write the data to the same or different memory block 510. In further additional or alternative embodiments, a buffer 506 may store data written to it from one or more memory blocks 508 (e.g., an SLC block) and re-write the data to the same or different memory block 510 and may store one or more memory blocks 510 (e.g., an MLC block) and re-write the data to the same or different memory block 510 as portions of a GC process and/or GC operations. In still further additional or alternative embodiments, a first buffer 506 may store data written to it from one or more memory blocks 508 (e.g., an SLC block) and re-write the data to the same or different memory block 510 as a first portion of a GC process and/or GC operations and a second buffer 506 may store one or more memory blocks 510 (e.g., an MLC block) and re-write the data to the same or different memory block 510 as a second portion of the GC process and/or GC operations.

The buffer 606, in various embodiments, may store data written to it from one or more memory blocks 508 (e.g., an SLC block) and re-write the data stored therein to one or more memory blocks 510 (e.g., an MLC block). In some embodiments, relocating the data stored in the SLC block(s) to the MLC block(s) may form at least a portion of a folding process and/or folding operations.

A controller 702 may include any suitable hardware and/or software that is known or developed in the future that may receive I/O requests (e.g., write requests, read requests, or the like). Further, the controller 702 may, in response to an I/O request, issue and/or generate a corresponding I/O command (e.g., a write command, read command, or the like).

In some embodiments, the controller 702 may determine and/or know the size of a write command that it is generating and/or issuing to the memory block(s) 508. In additional or alternative embodiments, the controller 702 may determine the size of the data (e.g., a data chunk) in a write command that it is generating and/or issuing to the memory block(s) 508. In various embodiments, the controller 702 may notify the GC component 150 and/or the folding component 152 of the size of a write command and/or a data chunk included in the write command prior to issuing and/or generating the write command.

The size of a write command and/or a data chunk in the write command may include any suitable size that may enable the data chunk to be written to one or more memory blocks 508. In various embodiments, the write command and/or data chunk may include a size of about 4 KB, 8 KB, 16 KB, or the like, among other sizes that are possible and contemplated herein.

Figure 7B:
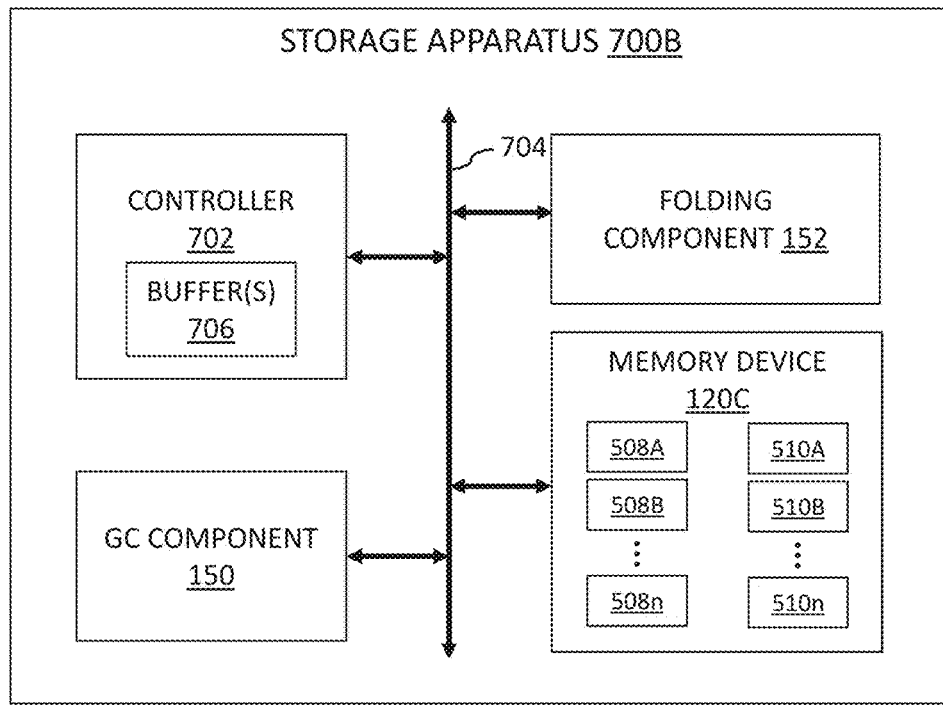

Referring to FIG. 7B, FIG. 7B is a block diagram of another embodiment of a storage apparatus 700B. At least in the illustrated embodiment, the storage apparatus 700B includes, among other components, a memory device 120C coupled to and/or in communication with a GC component 150, a folding component 152, and a controller 702 similar to the various embodiments discussed elsewhere herein and including one or more buffers 706 coupled to and/or in communication with each other via a bus 704.

A buffer 706 may include any suitable hardware and/or software that is known or developed in the future that may at least temporarily store computer-useable data. In various embodiments, the buffer(s) 706 may store computer-useable data that is written to the buffer(s) 706 from the memory block(s) 508 and the memory block(s) 510 and provide the data stored therein to a memory block 508 and/or to a memory block 510 similar to buffers 506A, 506B, 506C, and 606 discussed elsewhere herein. That is, the buffer(s) 706 may store data from and provide the data stored therein to the memory block(s) 508 and memory block(s) 510 as a portion of a GC process and/or operations and a portion of a folding process and/or folding operations.

The storage apparatus 700B, in some embodiments, includes at least one buffer 706 for a GC process/operations and at least one buffer 706 for a folding process/operations. In other embodiments, the storage apparatus 700B includes a buffer 706 for both GC process/operations and folding process/operations. In still other embodiments, the GC component 150 may include or is void of a buffer 506 and/or the folding component 152 may include or is void of a buffer 606.

Figure 8A:
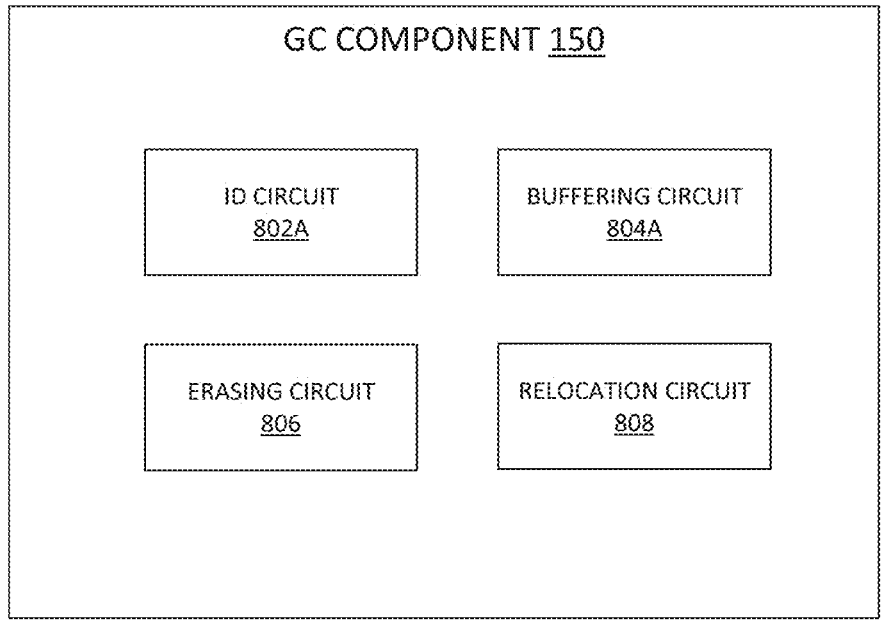
FIGS. 8A and 8B are schematic block diagrams illustrating various embodiments of a GC component.

Referring to FIG. 8A, FIG. 8A is a block diagram of one embodiment of a GC component 150. At least in the illustrated embodiment, the GC component 150 includes, among other components, an identification (ID) circuit 802A, a buffering circuit 804A, an erasing circuit 806, and a relocation circuit 808 for performing various compaction phases of a GC process and/or GC operations.

An identification circuit 802A may include any suitable hardware and/or software that may identify valid data (or valid data fragments) and/or invalid data (or invalid data fragments) in a source memory block (e.g., memory block 508 or a memory block 510). The valid data or valid data fragments may be identified in preparation for transferring and/or writing the valid data or valid data fragments from the source memory block to a buffer 506.

A buffering circuit 804A may include any suitable hardware and/or software that may write and/or accumulate data from a source memory block (e.g., memory block 508 or a memory block 510) to a buffer 506. In various embodiments, a buffering circuit 804A may write identified valid data or valid data fragments in a source memory block to a buffer 506 in response to a GC component 150 receiving a notification and/or notice from a controller (e.g., controllers 502A, 502B, 502C, 602, and 702) that the controller is going to issue a write command to a memory device (e.g., memory device 120, 120A, 120B, and 120C).

In various embodiments, the amount, quantity, and/or size of the valid data written from the source memory block (e.g., memory block 508 or memory block 510) to the buffer 506 during a particular I/O operation is based on the size of the write command, the size of a data chunk in the write command, and/or the ratio/proportion of valid data or valid data fragments to the total amount of data or data fragments in the source memory block. That is, the amount, quantity, and/or size of the valid data/data fragments written from the source memory block to the buffer 506 may be determined in accordance with one of the following equations:

Size of the data to be compacted=[(Number of valid fragments in the source block/Total number of fragments in the source block)×Size of the write command]; or (1)

Size of the data to be compacted=[(Number of valid fragments in the source block/Total number of fragments in the source block)×Size of a data chunk in the write command]. (2)

An erasing circuit 806 may include any suitable hardware and/or software that may erase and/or delete invalid data from a memory block 508/510 from which valid data has been written to a buffer 506 (e.g., a source memory block). That is, an erasing circuit 806, in various embodiments, may delete the invalid data from the source memory block in preparation for the source memory block to be used for storing data in the future. A relocation circuit 808 may include any suitable hardware and/or software that may write and/or relocate data stored in a buffer 506 to a destination memory block (e.g., a memory block 508 or a memory block 510). In some embodiments, a relocation circuit 808 may write and/or relocate valid data that is at least temporarily stored and/or accumulated in the buffer 506 to the same or a different memory block 508. In other embodiments, a relocation circuit 808 may write and/or relocate valid data that is at least temporarily stored and/or accumulated in the buffer 506 to the same or a different memory block 510.

In various embodiments, the amount, quantity, and/or size of the valid data written from the buffer memory 506 to a destination memory block (e.g., memory block 508 or memory block 510) during a particular I/O operation is based on the size of the write command, the size of a data chunk in the write command, and/or the ratio/proportion of valid data or valid data fragments to the total amount of data or data fragments in the source memory block. That is, the amount, quantity, and/or size of the valid data/data fragments written from the buffer 506 to the destination memory block may be determined in accordance with equation (1) or equation (2).

In some embodiments, the amount, quantity, and/or size of valid data (or valid data fragments) written from the source memory block to the buffer 506 and the data chunk in a write command written to the memory device (e.g., memory device 120, 120A, 120B, and 120C) are performed at the same time or at substantially the same time. In additional or alternative embodiments, the amount, quantity, and/or size of valid data (or valid data fragments) written from the buffer 506 to the destination memory block and the data chunk in a write command written to the memory device are performed at the same time or at substantially the same time. In further additional or alternative embodiments, the amount, quantity, and/or size of valid data (or valid data fragments) written from the source memory block to the buffer 506, the amount, quantity, and/or size of valid data (or valid data fragments) written from the buffer 506 to the destination memory block, and the data chunk in a write command written to the memory device are performed at the same time or at substantially the same time.

In various embodiments, the valid data or valid data fragments are identified in a source memory block, accumulated/written to a buffer 506, and relocated to a destination memory block and/or the invalid data is orphaned (e.g., no longer tracked) from a source memory block as part of a GC process and/or GC operations. That is, the various processes and/or operations performed by the identification circuit 802, buffering circuit 804, erasing circuit 806, and/or relocation circuit 808 may be considered portions of a GC process and/or GC operations.

Figure 8B:
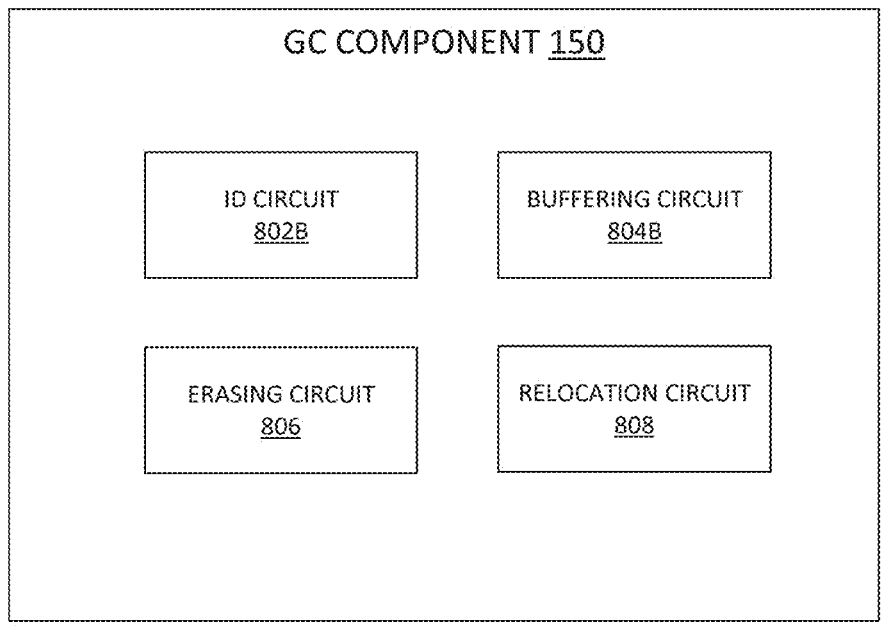

With reference to FIG. 8B, FIG. 8B is a block diagram of one embodiment of another GC component 150. At least in the illustrated embodiment, the GC component 150 includes, among other components, an identification circuit 802B and a buffering circuit 804B. The GC component 150 further includes an erasing circuit 806 and a relocation circuit 808 for performing various compaction phases of a GC process and/or GC operations similar to the various embodiments discussed elsewhere herein.

An identification circuit 802B may include any suitable hardware and/or software that may identify valid data (or valid data fragments) and/or invalid data (or invalid data fragments) in a plurality of source memory blocks (e.g., two or more memory blocks 508 or two or more memory blocks 510). The valid data or valid data fragments may be identified in preparation for transferring and/or writing the valid data or valid data fragments from the source memory blocks to a buffer 506.

A buffering circuit 804B may include any suitable hardware and/or software that may write and/or accumulate data from two or more source memory blocks (e.g., two or more memory blocks 508 or two or more memory blocks 510) to a buffer 506. In various embodiments, a buffering circuit 804B may write identified valid data or valid data fragments in the source memory blocks to a buffer 506 in response to a GC component 150 receiving a notification and/or notice from a controller (e.g., controllers 502A, 502B, 502C, 602, and 702) that the controller is going to issue a write command to a memory device (e.g., memory device 120, 120A, 120B, and 120C).

In some embodiments, an identification circuit 802B and/or a buffering circuit 804B may include and/or provide the operations of an identification circuit 802A and/or a buffering circuit 804A, respectively, to perform the GC process/operations on one or more source memory blocks (e.g., one or more memory blocks 508 or one or more memory blocks 510). In other embodiments, the GC component 150 may further include an identification circuit 802A and/or a buffering circuit 804A to perform the GC process/operations on one or more source memory blocks.

Figure 9A:
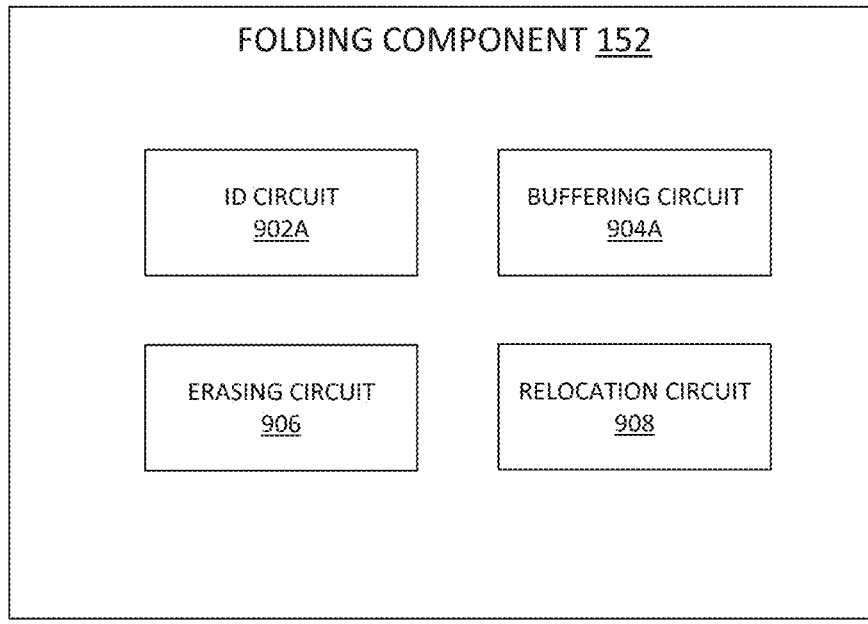
FIGS. 9A and 9B are schematic block diagrams illustrating various embodiments of a folding component.

Referring to FIG. 9A, FIG. 9A is a block diagram of one embodiment of a folding component 152. At least in the illustrated embodiment, the folding component 152 includes, among other components, an identification 902A, a buffering circuit 904A, an erasing circuit 906, and a relocation circuit 908 for performing various compaction phases of a folding process and/or folding operations.

An identification circuit 902A may include any suitable hardware and/or software that may identify and/or determine when a source memory block (e.g., a memory block 508) is full and/or includes greater than a predetermined amount of valid data and/or valid data fragments. The valid data or valid data fragments may be identified in preparation for transferring and/or writing the valid data or valid data fragments from the source memory block to a buffer 606.

A buffering circuit 904A may include any suitable hardware and/or software that may write and/or accumulate data from a source memory block (e.g., memory block 508) to a buffer 606. In various embodiments, a buffering circuit 904 may write identified valid data or valid data fragments in a source memory block to a buffer 606 in response to a folding component 152 receiving a notification and/or notice from a controller (e.g., controllers 502A, 502B, 502C, 602, and 702) that the controller is going to issue a write command to a memory device (e.g., memory device 120, 120A, 120B, and 120C).

In various embodiments, the amount, quantity, and/or size of the valid data written from the source memory block (e.g., memory block 508) to the buffer 606 during a particular I/O operation is based on the size of the write command, the size of a data chunk in the write command, and/or the ratio/proportion of valid data or valid data fragments to the total amount of data or data fragments in the source memory block. That is, the amount, quantity, and/or size of the valid data/data fragments written from the source memory block to the buffer 606 may be determined in accordance with equation (1) or equation (2).

An erasing circuit 906 may include any suitable hardware and/or software that may erase and/or delete invalid data from a memory block 508 from which valid data has been written to a buffer 606 (e.g., a source memory block). That is, an erasing circuit 906, in various embodiments, may delete the invalid data from the source memory block in preparation for the source memory block to be used for storing data in the future.

A relocation circuit 908 may include any suitable hardware and/or software that may write and/or relocate data. In some embodiments, a relocation circuit 908 may write and/or relocate data stored in a buffer 906 to a destination memory block (e.g., a memory block 510). That is, the valid data or valid data fragments are relocated from an SLC block to an MLC block, or the like.

In various embodiments, the amount, quantity, and/or size of the valid data written from the buffer memory 606 to a destination memory block (e.g., memory block 510) during a particular I/O operation is based on the size of the write command, the size of a data chunk in the write command, and/or the ratio/proportion of valid data or valid data fragments to the total amount of data or data fragments in the source memory block. That is, the amount, quantity, and/or size of the valid data/data fragments written from the buffer 606 to the destination memory block may be determined in accordance with equation (1) or equation (2).

In some embodiments, the amount, quantity, and/or size of valid data (or valid data fragments) written from the source memory block to the buffer 606 and the data chunk in a write command written to the memory device (e.g., memory device 120, 120A, 120B, and 120C) are performed at the same time or at substantially the same time. In additional or alternative embodiments, the amount, quantity, and/or size of valid data (or valid data fragments) written from the buffer 606 to the destination memory block and the data chunk in a write command written to the memory device are performed at the same time or at substantially the same time. In further additional or alternative embodiments, the amount, quantity, and/or size of valid data (or valid data fragments) written from the source memory block to the buffer 606, the amount, quantity, and/or size of valid data (or valid data fragments) written from the buffer 606 to the destination memory block, and the data chunk in a write command written to the memory device are performed at the same time or at substantially the same time.

In various embodiments, the valid data or valid data fragments are identified in a source memory block, accumulated/written to a buffer 606, and relocated to a destination memory block and/or the invalid data is erased from a source memory block as part of a folding process and/or folding operations. That is, the various processes and/or operations performed by the identification circuit 902, buffering circuit 904, erasing circuit 906, and/or relocation circuit 908 may be considered portions of a folding process and/or folding operations.

Figure 9B:
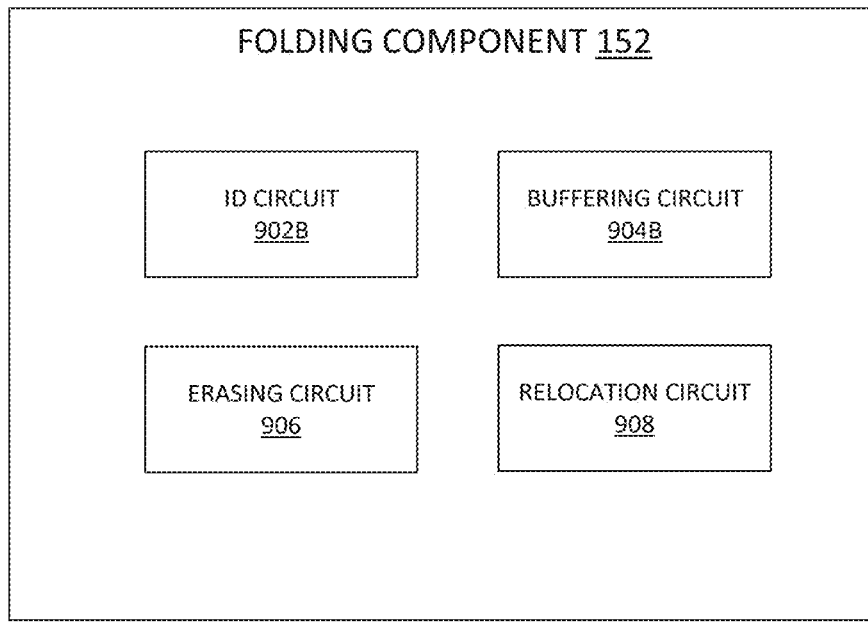

With reference to FIG. 9B, FIG. 9B is a block diagram of one embodiment of another folding component 152. At least in the illustrated embodiment, the folding component 152 includes, among other components, an identification circuit 902B and a buffering circuit 904B. The folding component 152 further includes an erasing circuit 906 and a relocation circuit 908 for performing various compaction phases of a folding process and/or folding operations similar to the various embodiments discussed elsewhere herein.

An identification circuit 902B may include any suitable hardware and/or software that may identify and/or determine when two or more source memory blocks (e.g., two or more memory blocks 508) are full and/or include greater than a predetermined amount of valid data and/or valid data fragments. The valid data or valid data fragments may be identified in preparation for transferring and/or writing the valid data or valid data fragments from the source memory blocks to a buffer 606.

A buffering circuit 904B may include any suitable hardware and/or software that may write and/or accumulate data from two or more source memory blocks (e.g., two or more memory blocks 508) to a buffer 606. In various embodiments, a buffering circuit 904B may write identified valid data or valid data fragments in the source memory blocks to a buffer 606 in response to a folding component 152 receiving a notification and/or notice from a controller (e.g., controllers 502A, 502B, 502C, 602, and 702) that the controller is going to issue a write command to a memory device (e.g., memory device 120, 120A, 120B, and 120C).

In some embodiments, an identification circuit 902B and/or a buffering circuit 904B may include and/or provide the operations of an identification circuit 902A and/or a buffering circuit 904A, respectively, to perform the folding process/operations on one or more source memory blocks (e.g., one or more memory blocks 508). In other embodiments, the folding component 152 may further include an identification circuit 902A and/or a buffering circuit 904A to perform the folding process/operations on one or more source memory blocks.

Figure 10A:
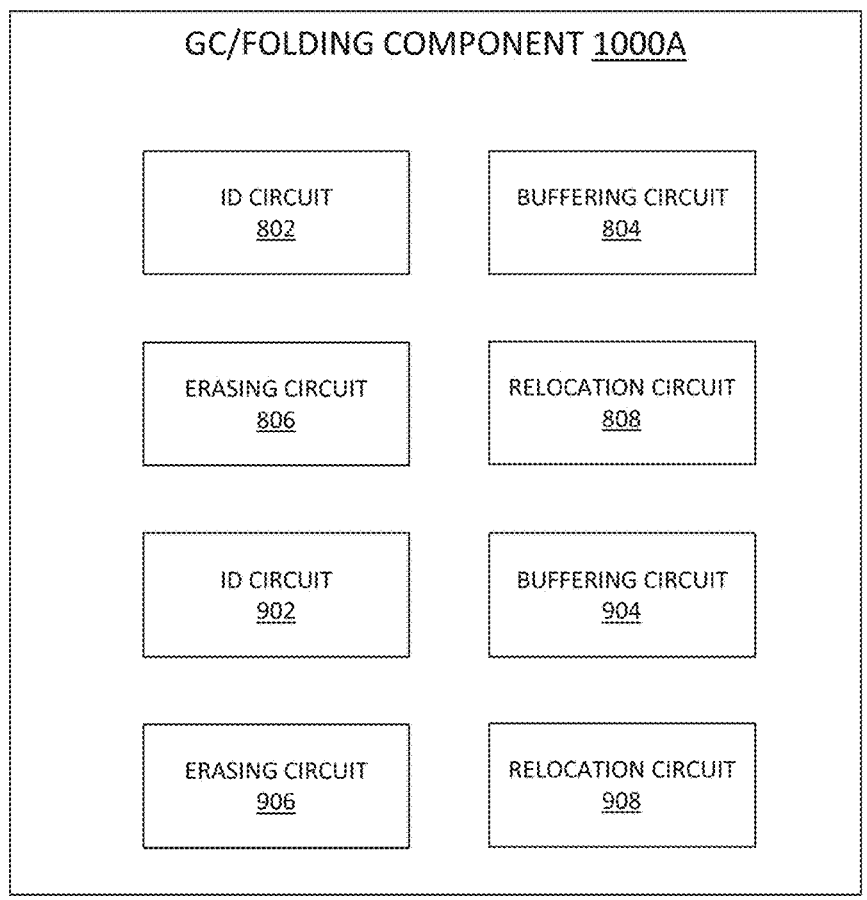
FIGS. 10A through 10D are schematic block diagrams illustrating various embodiments of a combined GC/folding component.

With reference to FIG. 10A, FIG. 10A is a block diagram of one embodiment of a combined GC/folding component 1000A. At least in the illustrated embodiment, the GC/folding component 1000A includes, among other components, an identification circuit 802, a buffering circuit 804, an erasing circuit 806, and a relocation circuit 808 similar to the various embodiments discussed elsewhere herein. The GC/folding component 1000A further includes an identification circuit 902, a buffering circuit 904, an erasing circuit 906, and a relocation circuit 908 similar to the various embodiments discussed elsewhere herein for performing various compaction phases of a GC process/operations and a folding process/operations.

Figure 10B:
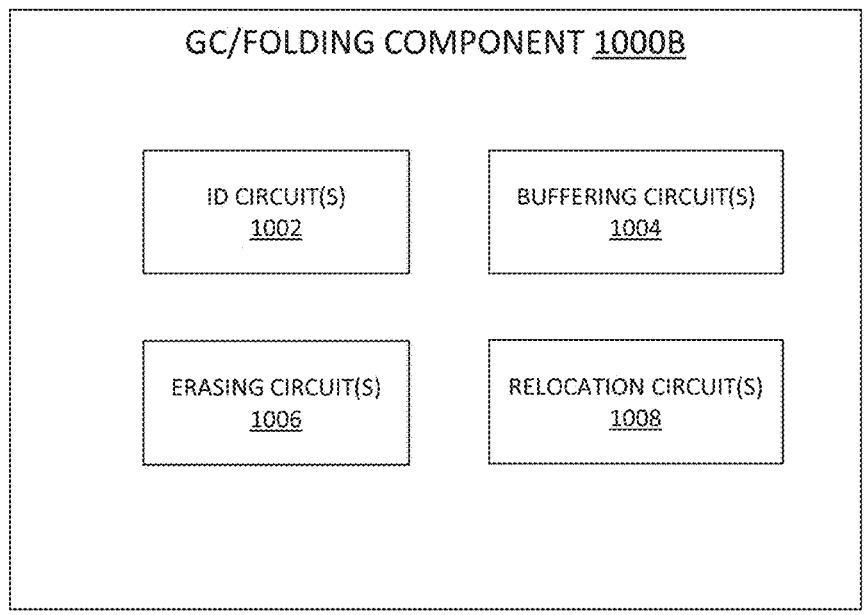

Referring to FIG. 10B, FIG. 10B is a block diagram of another embodiment of a combined GC/folding component 1000B. At least in the illustrated embodiment, the GC/folding component 1000B includes, among other components, one or more identification circuits 1002, one or more buffering circuits 1004, one or more erasing circuits 1006, and one or more relocation circuits 1008 for performing various compaction phases of a GC process/operations and a folding process/operations.

In various embodiments, the identification circuit(s) 1002 include the identification circuit(s) 802 and/or 902. In additional or alternative embodiments, the buffering circuit(s) 1004 include the buffering circuit(s) 804 and/or 904. In further additional or alternative embodiments, the erasing circuit(s) 1006 include the erasing circuit(s) 806 and/or 906. In still further additional or alternative embodiments, the relocation circuit(s) 1008 include the relocation circuit(s) 808 and/or 908.

Figure 10C:
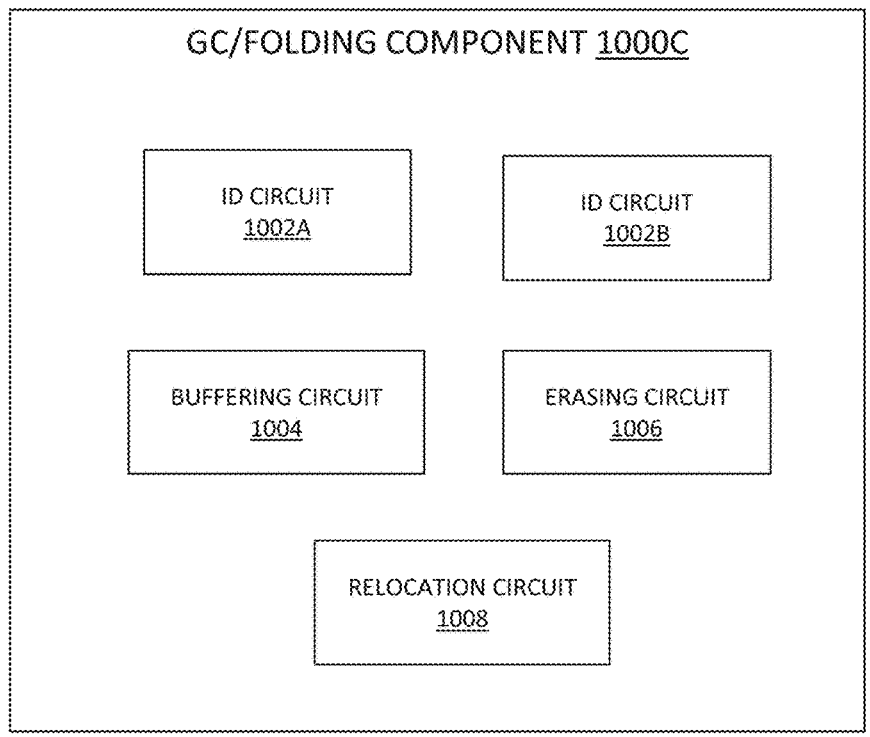

For example, FIG. 10C illustrates a GC/folding component 1000C that includes an identification circuit 1002A including an identification circuit 802 and an identification circuit 1002B including the compaction circuit 902. Further, the GC/folding component 1000C includes a single buffering circuit 1004 that includes the buffering circuits 804 and 904, a single erasing circuit 1006 that includes the erasing circuits 806 and 906, and a single relocation circuit 1008 that includes the relocation circuits 808 and 908.

Figure 10D:
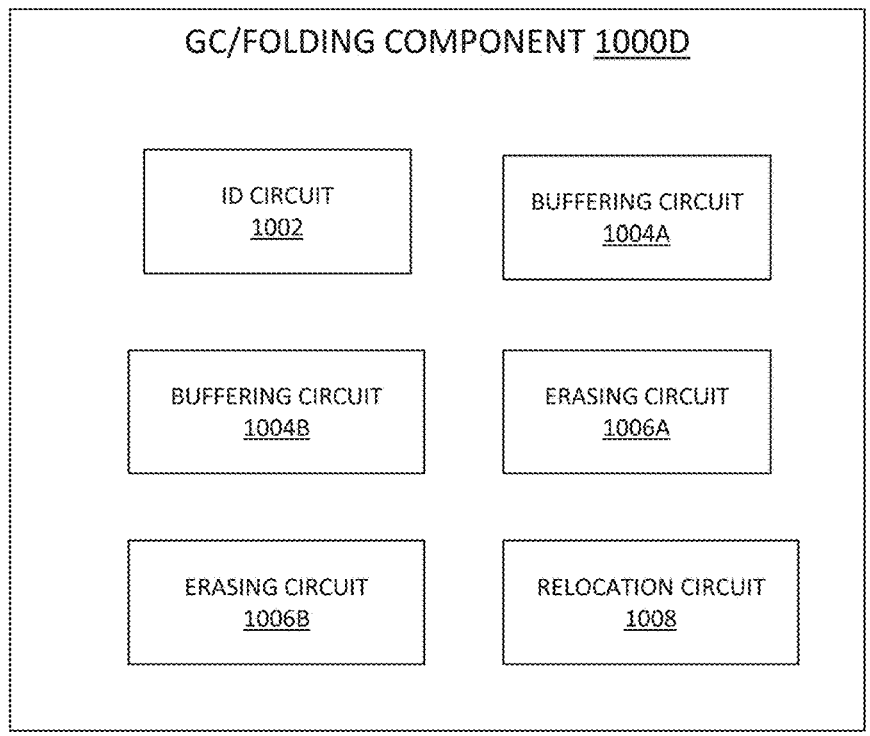

In another non-limiting example, FIG. 10D illustrates a GC/folding component 1000D that includes a single identification circuit 1002 that includes the identification circuits 802 and 902 and a single relocation circuit 1008 that includes the relocation circuits 808 and 908. Further, the GC/folding component 1000D includes a buffering circuit 1004A that includes the buffering circuit 804, a buffering circuit 1004B that includes the buffering circuit 904, an erasing circuit 1006A that includes the erasing circuit 806, and an erasing circuit 1006B that includes the erasing circuit 906.

While FIGS. 10C and 10D show specific examples of a GC/folding component 1000, the various embodiments are not limited to these examples. Rather, the various embodiments include any and all combinations of one or more identification circuits 1002, one or more buffering circuits 1004, one or more erasing circuits 1006, and/or one or more relocation circuits 1008.

Figure 11A:
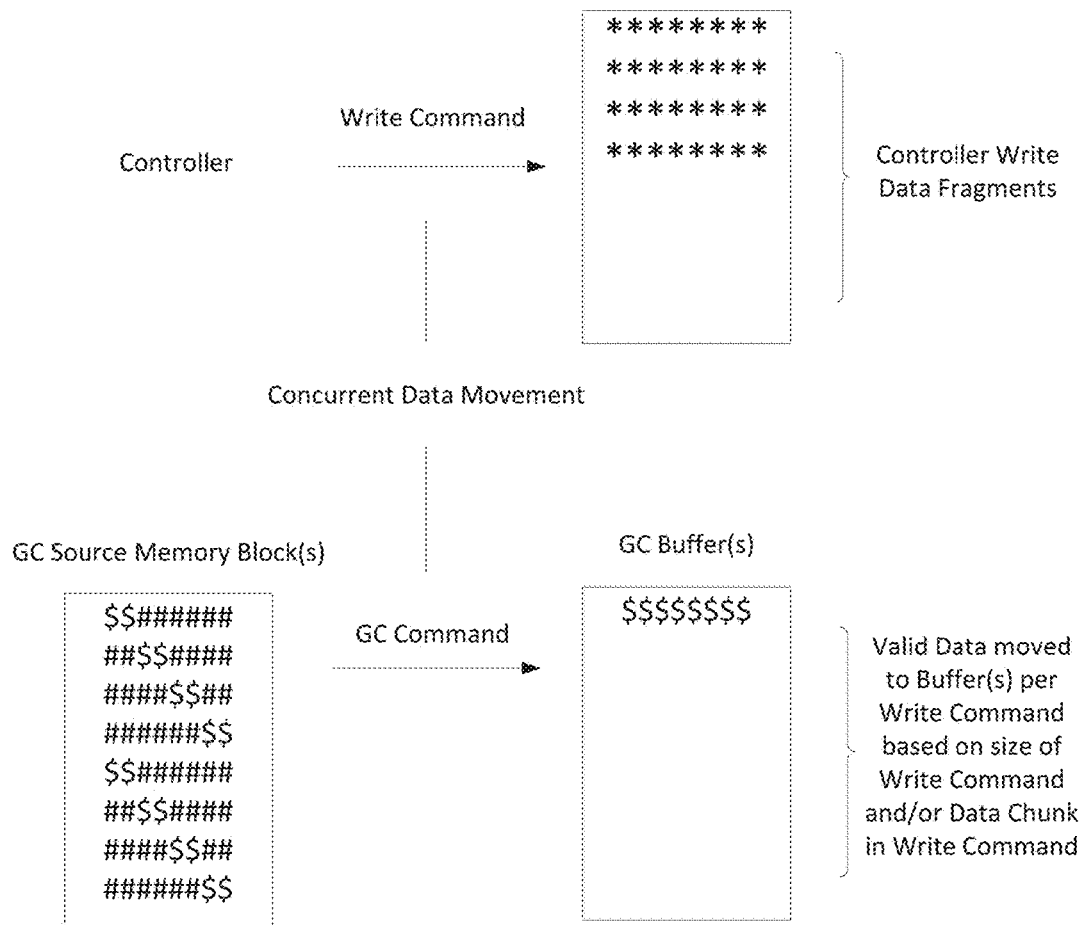
FIGS. 11A and 11B are diagrams illustrating compaction ratios in various embodiments of a GC process with respect to input/output (I/O) operations.

With reference to FIG. 11A, FIG. 11A is a diagram illustrating one example of a portion of a compaction process/operations of a GC component 150 and a portion of an I/O process/operations (e.g., write operations) of a controller (e.g., controllers 126, 502A, 502B, 502C, 602, and 702, or the like) during one clock cycle. A GC component 150 and its associated controller, in various embodiments, are configured to perform their respective GC process/operations on a source memory block (e.g., memory block 508 and memory block 510, or the like) and I/O operations (e.g., write operations) on a memory device (e.g., memory device 120, 120A, 120B, and 120C) concurrently, at the same time, or at substantially the same time. That is, the GC component 150 and the controller are configured to perform their respective GC process/operations and write operations in parallel during a particular clock cycle so that space in a source memory block is freed by a GC process/operation at the same time that space in a memory device is being consumed by an I/O operation.

In the example shown in FIG. 11A, the specific operations performed by the GC component 150 include, but are not limited to, determining a size (e.g., a quantity of host data fragments) of a write command, which can be any suitable size and is arbitrarily selected as thirty-two (32) units of data fragments in this non-limiting example. The GC component 150 further determines the ratio or percentage of valid data compared to the total amount of data in the GC source memory block(s), which is arbitrarily selected as twenty-five percent (25%) in this non-limiting example. The GC component 150 calculates the amount of the valid data that will be written to the GC buffer by multiplying the size of the write command and the determined ratio, which is eight (8) units of data fragments (32 units of data fragments*0.25=8 units of data fragments) in this non-limiting example. The valid data (or valid data fragments) are written by the GC component 150 to a buffer (e.g., buffer 506A, buffer 506B, and buffer 506C) for at least temporary storage.

The above process can be referred to as compacting valid data, data compaction, or simply compaction. In some embodiments, by the time a first host storage block is completely written to and/or has become full, a second host storage block has become available (e.g., has become empty, has greater than a predetermined amount of available storage space, has greater than a predetermined percentage/ratio of available storage space, and/or the like) for storing data via compaction during a GC process/operation.

Figure 11B:
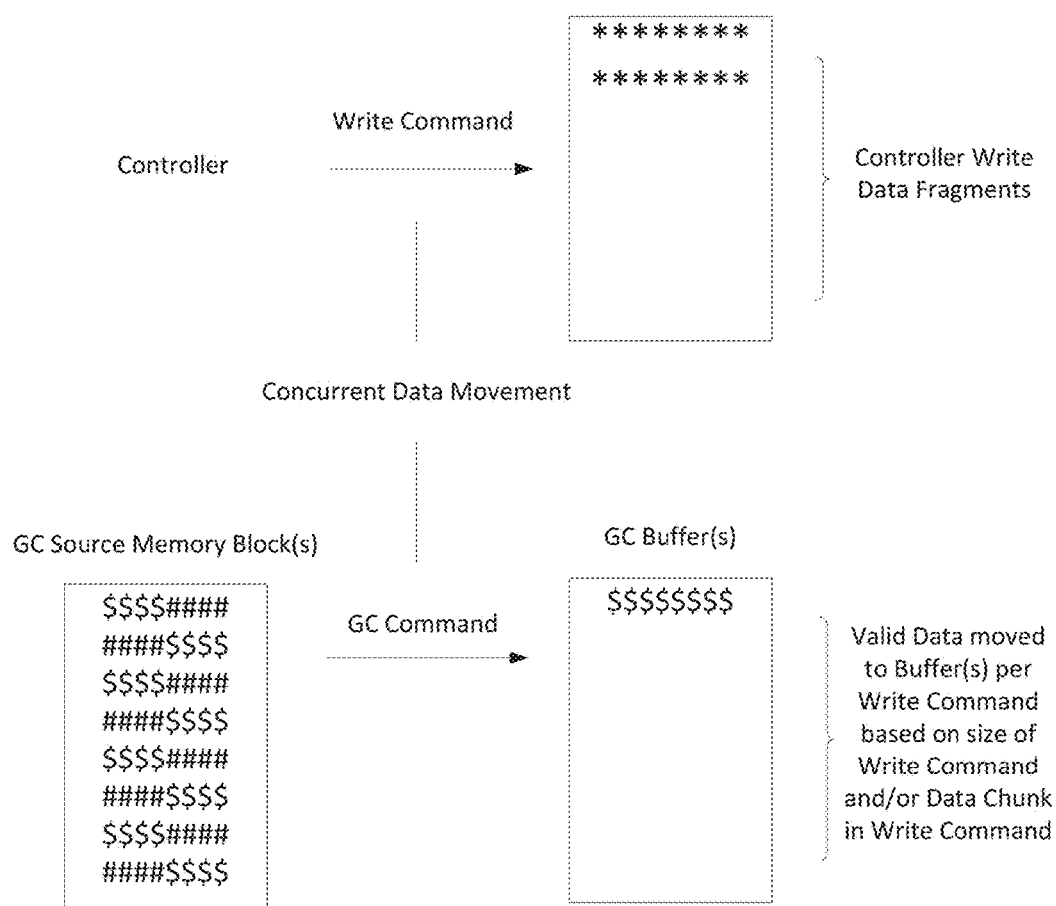

Referring to FIG. 11B, FIG. 11B is a diagram illustrating another example portion of a compaction process/operations of the GC component 150 and another portion of the I/O process/operations (e.g., write operations) of the controller during another clock cycle. In this non-limiting example, the write command includes thirty-two (32) units of data fragments, although other sizes are possible and contemplated herein, and the ratio or percentage of valid data is arbitrarily selected as fifty percent (50%) such that the GC component 150 calculates that the amount of the valid data that will be written to the GC buffer is sixteen (16) units of data fragments (32 units of data fragments*0.5=16 units of data fragments). The GC component 150 may then write the 16 units of valid data (or valid data fragments) to the buffer (e.g., buffer 506A, buffer 506B, and buffer 506C) for at least temporary storage.

In yet another non-limiting example in which the write command and/or a data chunk in the write command includes a size of about 4 KB (although other sizes are possible and contemplated herein) and the ratio of the valid data and/or valid data fragments in the source memory block that is the target of a GC process and/or GC operations is seventy-five percent (75%), the amount of valid data that will be transferred (e.g., compacted) to the buffer is 3 KB (4 KB*0.75=3 KB). If the source memory block includes less than or equal to 3 KB of valid data, all of the valid data in the source memory block may be written or transferred to the buffer. That is, the ratio multiplied by the size of the write request can be considered, in some embodiments, the maximum amount of data that may be compacted during any particular clock cycle and any amount of valid data less than the calculated amount will be compacted when the data in a write request is written to memory. If the source memory block includes greater than 3 KB of valid data, the valid data that is not transferred/compacted during this clock cycle will be written or transferred to the buffer during a subsequent clock cycle, provided that the data is still valid.

In continuing this non-limiting example, the next clock cycle may include a write command including the same size or a different size. Further, the ratio of valid data to total data may have increased, decreased, or stayed the same. Here, the controller may notify the GC component 150 of the size of this write command and/or the data chunk included in the write command and a compaction calculation may be performed based on the newly determined size and/or ratio.

Basing the amount, quantity, and/or size of the valid data and/or valid data fragments in a source memory block that are written to a buffer during compaction in a GC process and/or GC operations based on the size of a write command (e.g., a data chunk in the write command) and/or on the ratio of valid data to total data in a source memory block may provide improved GC performance. For example, a data fragment in a source memory block may become invalid during the time between writing two portions of the valid data or clock cycles. Here, writing different portions of the valid data (or valid data fragments) in series may have the effect of delaying GC operations on the source memory block and a data fragment that may have been valid when the first portion was written to the buffer during a first clock cycle may have became invalid before the second clock cycle. As such, the data fragment that has become invalidated will not be included in a subsequent GC operation (e.g., compaction process) that writes valid data or valid data fragments to the buffer and may be orphaned (e.g., erased, deleted, etc.) when the source memory block is prepared for subsequent use.

In various embodiments, the GC component 150 may detect and/or determine errors in a compaction process (e.g., when a valid data fragment is not relocated to a destination memory block, the valid data fragment is not marked as relocated from the source memory block, or the like, among other types of errors that are possible and contemplated herein). In response to the error, the GC component 150 may determine a compensating amount, quantity, and/or size of the valid data and/or valid data fragments in the source memory block for the next iteration of a GC process and/or GC operations. In some embodiments, the valid data fragments that are the subject of the error (e.g., failed fragments (FF)) are added to the amount, quantity, and/or size of the valid data and/or valid data fragments in the source memory block in equation (1) or equation (2) to create a compensating amount of valid data (CAVDC). The CAVDC may be determined in accordance with one of the following equations:

$$\text{Size of the data to be compacted} = [(\text{Number of valid fragments in the source block} + \text{Number of FF})/\text{Total number of fragments in the source block}] \times \text{Size of the write command; or} \qquad (3)$$

$$\text{Size of the data to be compacted} = [(\text{Number of valid fragments in the source block} + \text{Number of FF})/\text{Total number of fragments in the source block}] \times \text{Size of a data chunk in the write command}]. \qquad (4)$$

In situations in which there are a GC process and/or GC operations to be performed during a particular clock cycle, but there are no write operations to be performed, the GC component 150 may perform the GC process and/or GC operations and the controller may be idle with respect to performing write operations during this particular clock cycle. Similarly, in situations in which there are write operations to be performed during a particular clock cycle, but there are no GC operations to be performed, the controller may perform the write operations and the GC component 150 may be idle with respect to performing a GC process and/or GC operations during this particular clock cycle.

Figure 12A:
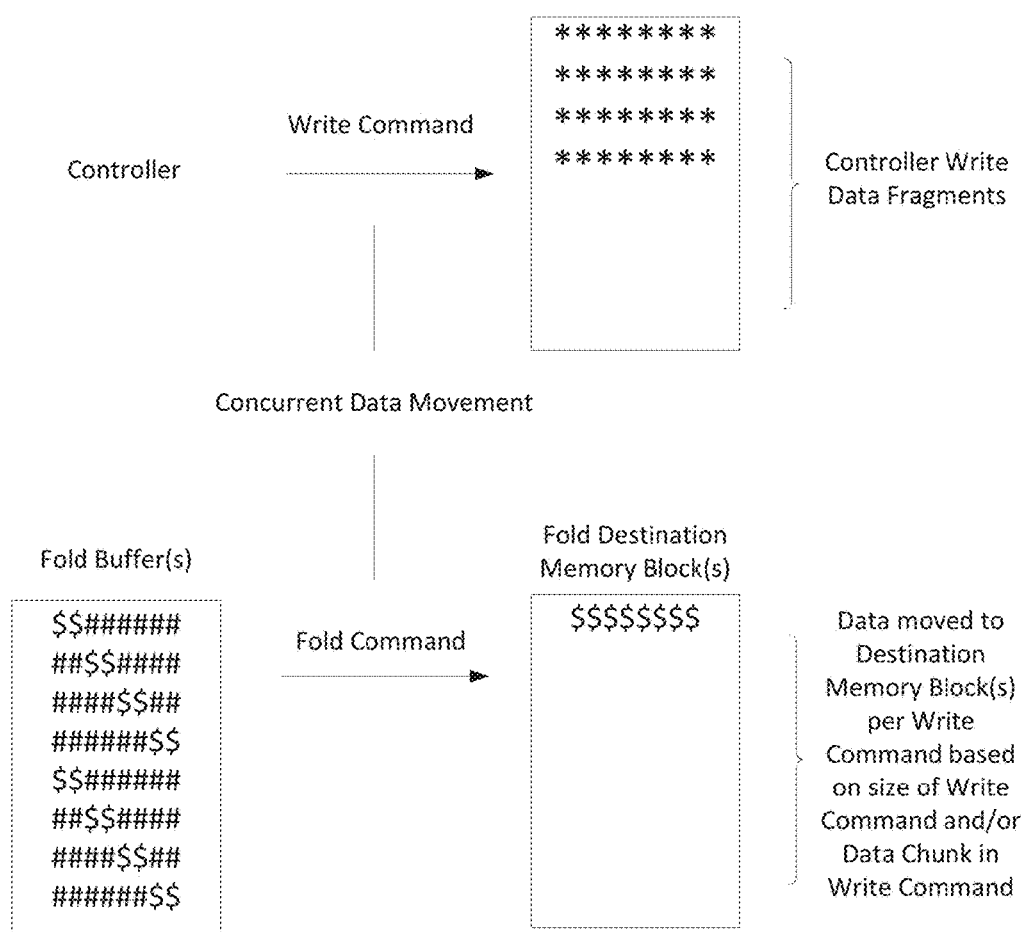

With reference to FIG. 12A, FIG. 12A is a diagram illustrating one example of a portion of a compaction process/operations of a folding component 152 and a portion of an I/O process/operations (e.g., write operations) of a controller (e.g., controllers 126, 502A, 502B, 502C, 602, and 702, or the like) during one clock cycle. A folding component 152 and its associated controller, in various embodiments, are configured to perform their respective folding process/operations on a source memory block (e.g., a memory block 508 or fold buffer) and I/O operations (e.g., write operations) on a memory device (e.g., memory device 120, 120A, 120B, and 120C) concurrently, at the same time, or at substantially the same time. That is, the folding component 152 and the controller are configured to perform their respective folding process/operations and write operations in parallel during a particular clock cycle so that space in a source memory block is freed by a folding process/operation at the same time that space in a memory device is being consumed by an I/O operation.

In the example shown in FIG. 12A, the specific operations performed by the folding component 152 include, but are not limited to, determining a size (e.g., a quantity of host data fragments) of a write command, which can be any suitable size and is arbitrarily selected as thirty-two (32) units of data fragments in this non-limiting example. The folding component 152 further determines the ratio or percentage of valid data compared to the total amount of data in the fold buffer(s), which is arbitrarily selected as twenty-five percent (25%) in this non-limiting example. The folding component 152 calculates the amount of the valid data that will be written to the fold destination block by multiplying the size of the write command and the determined ratio, which is eight (8) units of data fragments (32 units of data fragments*0.25=8 units of data fragments) in this non-limiting example. The valid data (or valid data fragments) is written by the folding component 152 from the fold buffer (e.g., an SLC block) to a memory block 510 (e.g., an MLC block).

Referring to FIG. 12B, FIG. 12B is a diagram illustrating another example portion of a compaction process/operations of the folding component 152 and another portion of the I/O process/operations (e.g., write operations) of the controller during another clock cycle. In this non-limiting example, the write command includes thirty-two (32) units of data fragments, although other sizes are possible and contemplated herein, and the ratio or percentage of valid data is arbitrarily selected as fifty percent (50%) such that the folding component 152 calculates that the amount of the valid data that will be written to the destination memory block is sixteen (16) units of data fragments (32 units of data fragments*0.5=16 units of data fragments). The folding component 152 may then write the 16 units of valid data (or valid data fragments) to the destination memory block (e.g., a memory block 510) for storage. That is, the valid data or valid data fragments are written from the buffer 606 to an MLC block, which results in the valid data or valid data fragments being folded from an SLC block to an MLC block.

Basing the amount, quantity, and/or size of the valid data and/or valid data fragments in a buffer that are written to an MLC memory device during a folding process and/or folding operations based on the size of a write command and/or based on the ratio of valid data to the total amount of data in the buffer may provide improved folding performance. For example, a data fragment in a buffer may become invalid during the time between writing two portions of the valid data or valid data fragments in the buffer to the destination memory device. Here, writing different portions of the valid data or valid data fragments in series may have the effect of delaying folding operations on the buffer and a data fragment that may have been valid when the first portion was written to the buffer 606 may have became invalid during this time. As such, the data fragment that has become invalidated will not be included in a subsequent portion of the folding process/operations that writes valid data or valid data fragments from the buffer 606 to the MLC memory device and may be orphaned (e.g., erased, deleted, etc.) as a portion of a GC process and/or GC operations.

In situations in which there are a folding process and/or folding operations to be performed during a particular clock cycle, but there are no write operations to be performed, the folding component 152 may perform the folding process and/or folding operations and the controller may be idle with respect to performing write operations during this particular clock cycle. Similarly, in situations in which there are write operations to be performed during a particular clock cycle, but there are no folding operations to be performed, the controller may perform the write operations and the folding component 152 may be idle with respect to performing a folding process and/or folding operations during this particular clock cycle.

In various embodiments, the folding component 152 may detect and/or determine errors in a compaction process (e.g., when a valid data fragment is not relocated to a destination memory block, the valid data fragment is not marked as relocated from the source memory block, or the like, among other types of errors that are possible and contemplated herein). In response to the error, the folding component 152 may determine a compensating amount, quantity, and/or size of the valid data and/or valid data fragments in the source memory block for the next iteration of a folding process and/or folding operations. In some embodiments, the valid data fragments that are the subject of the error (e.g., failed fragments (FF)) are added to the amount, quantity, and/or size of the valid data and/or valid data fragments in the source memory block in equation (1) or equation (2) to create a compensating amount of valid data (CAVDC). The CAVDC may be determined in accordance with one of equation (3) or equation (4).

Figure 13:
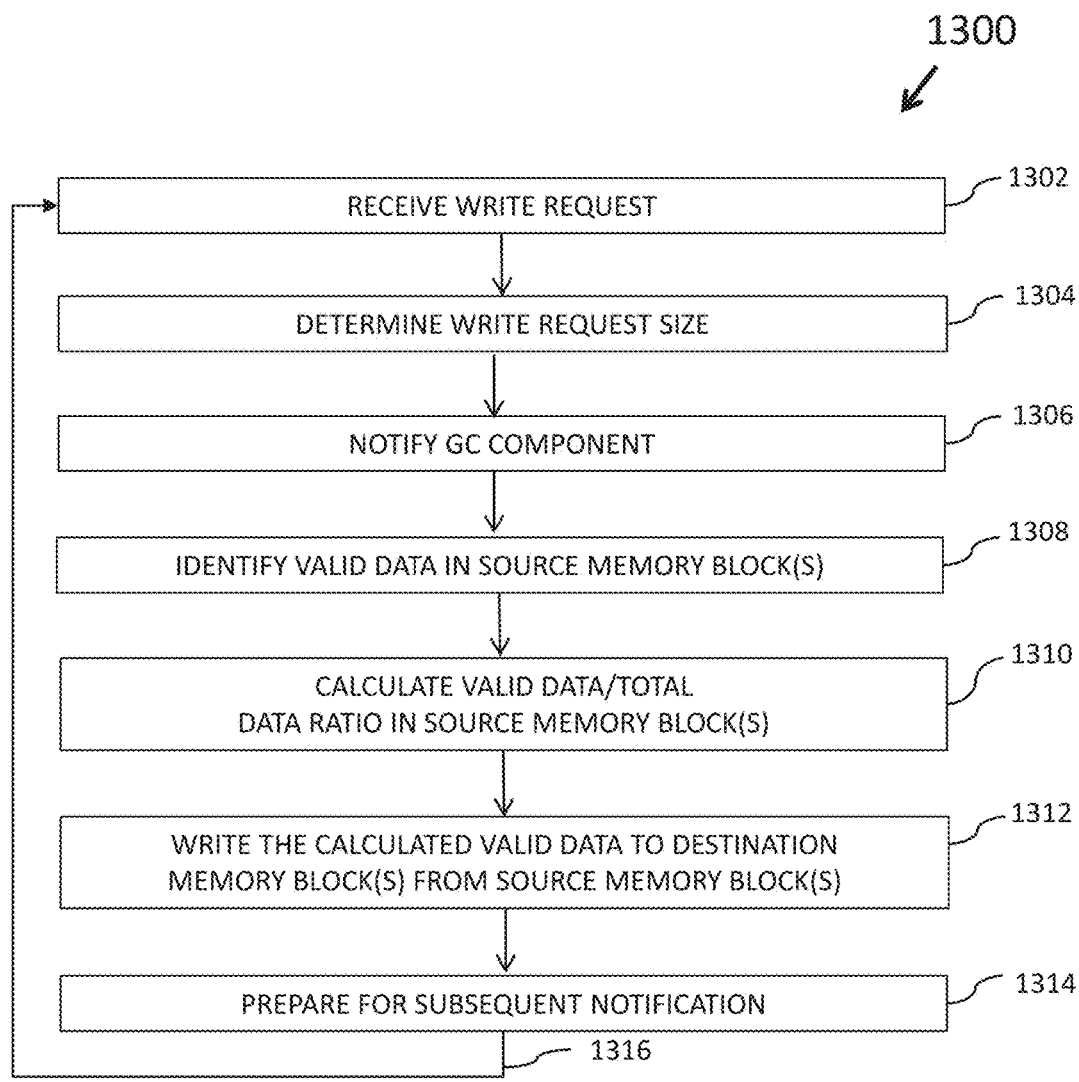
FIG. 13 is a schematic flow chart diagram illustrating one embodiment of a method 1300 for performing a GC process.

FIG. 13 is a schematic flow chart diagram illustrating one embodiment of a method 1300 for performing a GC process. At least in the illustrated embodiment, the method 1300 begins by a controller (e.g., controller 126, 502A, 502B, 502C, and 702, or the like) receiving an I/O request to write a data chunk (e.g., a write request) to a memory device (e.g., memory device 120, 120A, 120B, and 120C, or the like) (block 1302).

In various embodiments, the controller may determine and/or detect the size of a write command associated with the write request and/or the data chunk included in the write command (block 1304) and notify a GC component (e.g., GC component 150) of the write command (block 1306). The GC component 150, in response to the notification, may identify valid data and/or valid data fragment(s) in one or more source memory blocks (e.g., one or more memory blocks 508 and/or one or more memory blocks 510) that are the target(s) of a GC process and/or GC operations (block 1308).

The GC component 150 can then calculate the ratio of valid data to total amount of data in the source memory block(s) to determine an amount of valid data to transfer to one or more destination memory blocks (e.g., one or more memory blocks 508 and one or more memory blocks 510) by multiplying the ratio and the write command size (block 1310). The calculated valid data/valid data fragment(s) are written/transferred to the one or more destination memory blocks (e.g., one or more memory blocks 510) (block 1312). In some embodiments, the valid data/valid data fragment(s) are written to the one or more destination memory blocks at the same time or at substantially the same time as the data chunk in the write command is written to the memory device.

The GC component 150 may then perform operations to prepare for receipt of a subsequent notification from the controller (block 1314). Blocks 1302 through 1314 may then repeated (return 1316).

Figure 14A:
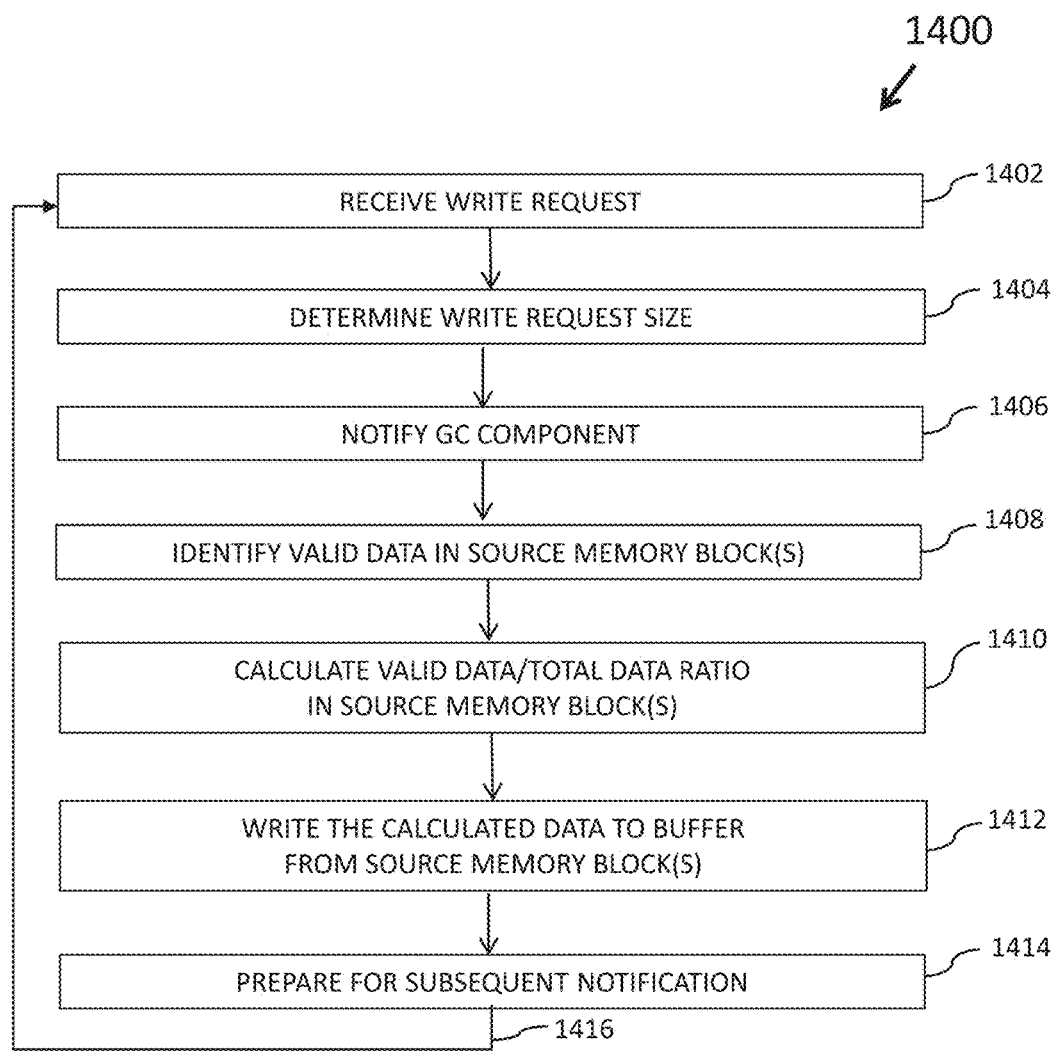
FIGS. 14A and 14B are schematic flow chart diagrams illustrating various embodiments of a method for performing a folding process.

FIG. 14A is a schematic flow chart diagram illustrating one embodiment of a method 1400 for performing a GC process. At least in the illustrated embodiment, the method 1400 begins by a controller (e.g., controller 126, 502A, 502B, 502C, and 702, or the like) receiving an I/O request to write a data chunk (e.g., a write request) to a memory device (e.g., memory device 120, 120A, 120B, and 120C, or the like) (block 1402).

In various embodiments, the controller may determine and/or detect the size of a write command associated with the write request and/or the data chunk included in the write command (block 1404) and notify a GC component (e.g., GC component 150) of the write command (block 1406). The GC component 150, in response to the notification, may identify valid data and/or valid data fragment(s) in one or more source memory blocks (e.g., one or more memory blocks 508 and/or one or more memory blocks 510) that are the target(s) of a GC process and/or GC operations (block 1408).

The GC component 150 can then calculate the ratio of valid data to total amount of data in the source memory block(s) to determine an amount of valid data to transfer to one or more buffers (e.g., buffers 506A, 506B, 506C, and 702, or the like) by multiplying the ratio and the write command size (block 1410). The calculated valid data/valid data fragment(s) are written/transferred to the one or more buffers (block 1412). In some embodiments, the valid data/ valid data fragment(s) are written to the one or more buffers at the same time or at substantially the same time as the data chunk in the write command is written to the memory device.

The GC component 150 may then perform operations to prepare for receipt of a subsequent notification from the controller (block 1414). Blocks 1402 through 1414 may then repeated (return 1416).

Figure 14B:
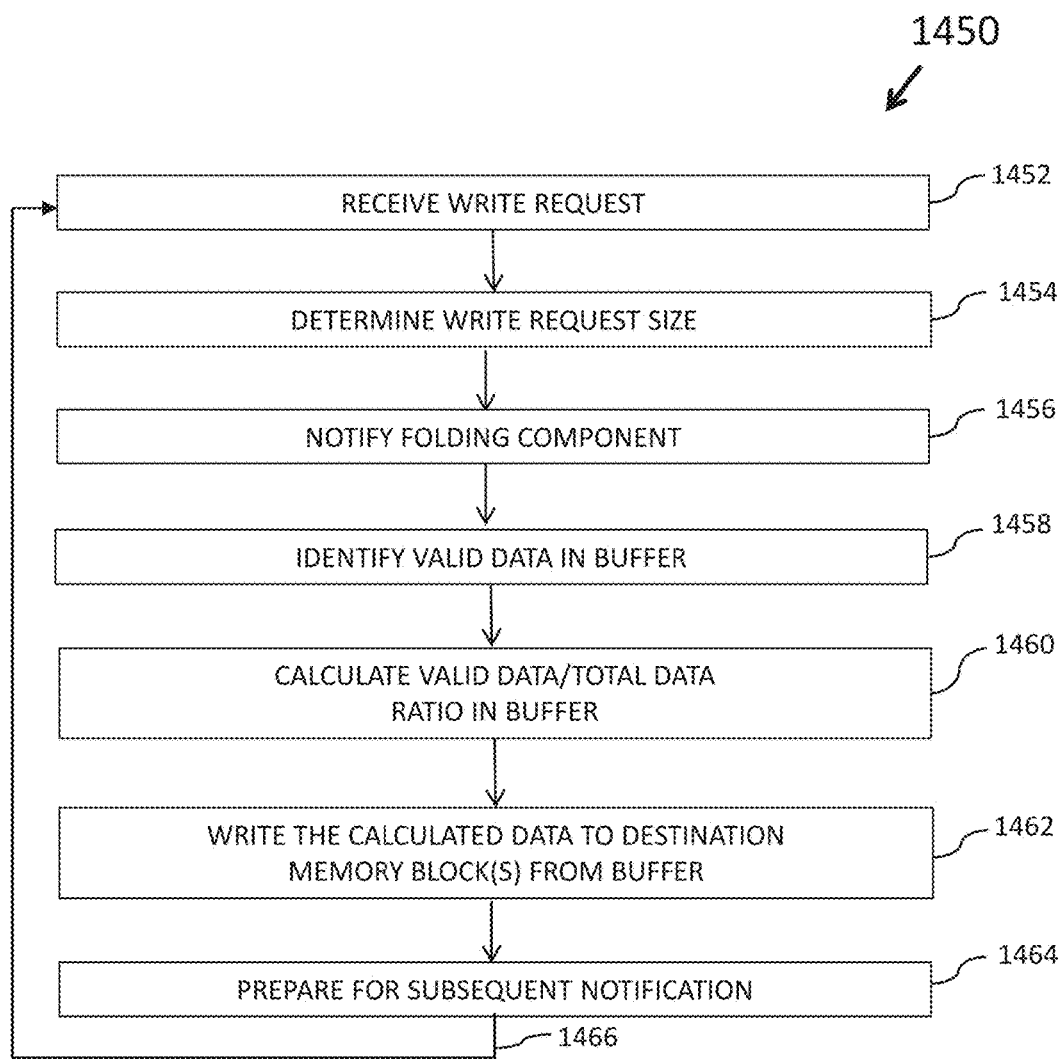

FIG. 14B is a schematic flow chart diagram illustrating one embodiment of a method 1450 for performing a folding process. At least in the illustrated embodiment, the method 1450 begins by a controller (e.g., controller 126, 502A, 502B, 502C, and 702, or the like) receiving an I/O request to write a data chunk (e.g., a write request) to a memory device (e.g., memory device 120, 120A, 120B, and 120C, or the like) (block 1452).

In various embodiments, the controller may determine and/or detect the size of a write command associated with the write request and/or the data chunk included in the write command (block 1454) and notify a folding component (e.g., folding component 152) of the write command (block 1456). The folding component 152, in response to the notification, may identify valid data and/or valid data fragment(s) in one or more buffers (e.g., buffers 506A, 506B, 506C, and 702, or the like) that are the target(s) of a folding process and/or folding operations (block 1458).

The folding component 152 can then calculate the ratio of valid data to total amount of data in the buffer(s) to determine an amount of valid data to transfer to one or more destination memory blocks by multiplying the ratio and the write command size (block 1460). The calculated valid data/valid data fragment(s) are written/transferred to the one or more destination memory blocks (block 1462). In some embodiments, the valid data/valid data fragment(s) are written to the one or more destination memory blocks at the same time or at substantially the same time as the data chunk in the write command is written to the memory device. The folding component 152 may then perform operations to prepare for receipt of a subsequent notification from the controller (block 1464). Blocks 1452 through 1464 may then repeated (return 1466).

Figure 15:
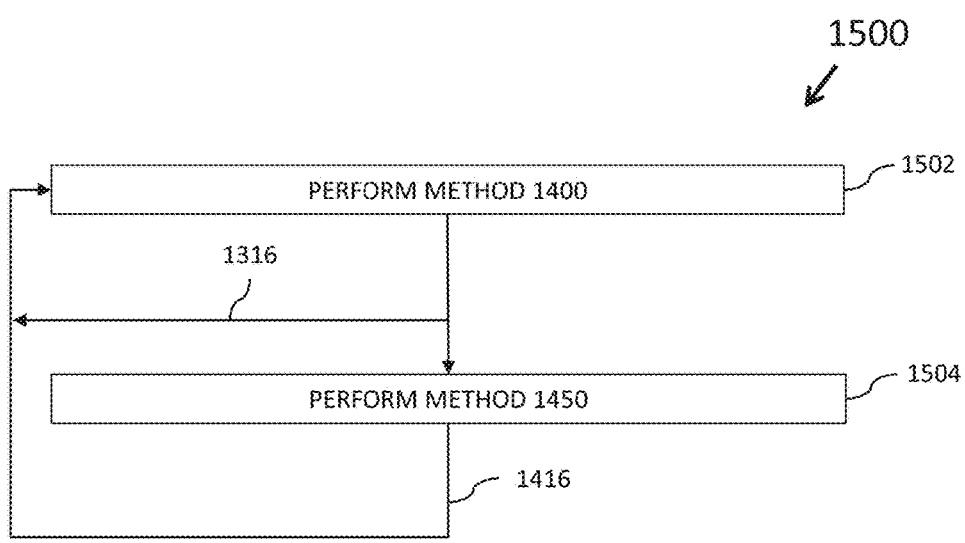
FIG. 15 is a schematic flow chart diagram illustrating one embodiment of a method for performing a GC/folding process.

FIG. 15 is a schematic flow chart diagram illustrating one embodiment of a method 1500 for performing a GC/folding process. At least in the illustrated embodiment, the method 1500 includes the method 1400 and the method 1450.

In some embodiments, the method 1450 is performed subsequent to the method 1400 and the operations in the blocks 1452 and 1454 may be performed as a portion of the blocks 1402 and 1404, respectively. In additional or alternative embodiments, the method 1400 may omit the return 1416. In other additional or alternative embodiments, the method 1400 may include, prior to the return 1416, a determination whether the method 1450 is to be performed. In response to a "YES" determination, the return 1416 is omitted and the method 1450 is performed. In response to a "NO" determination, the return 1416 is performed and the method 1450 is omitted in this particular iteration.

Figure 16:
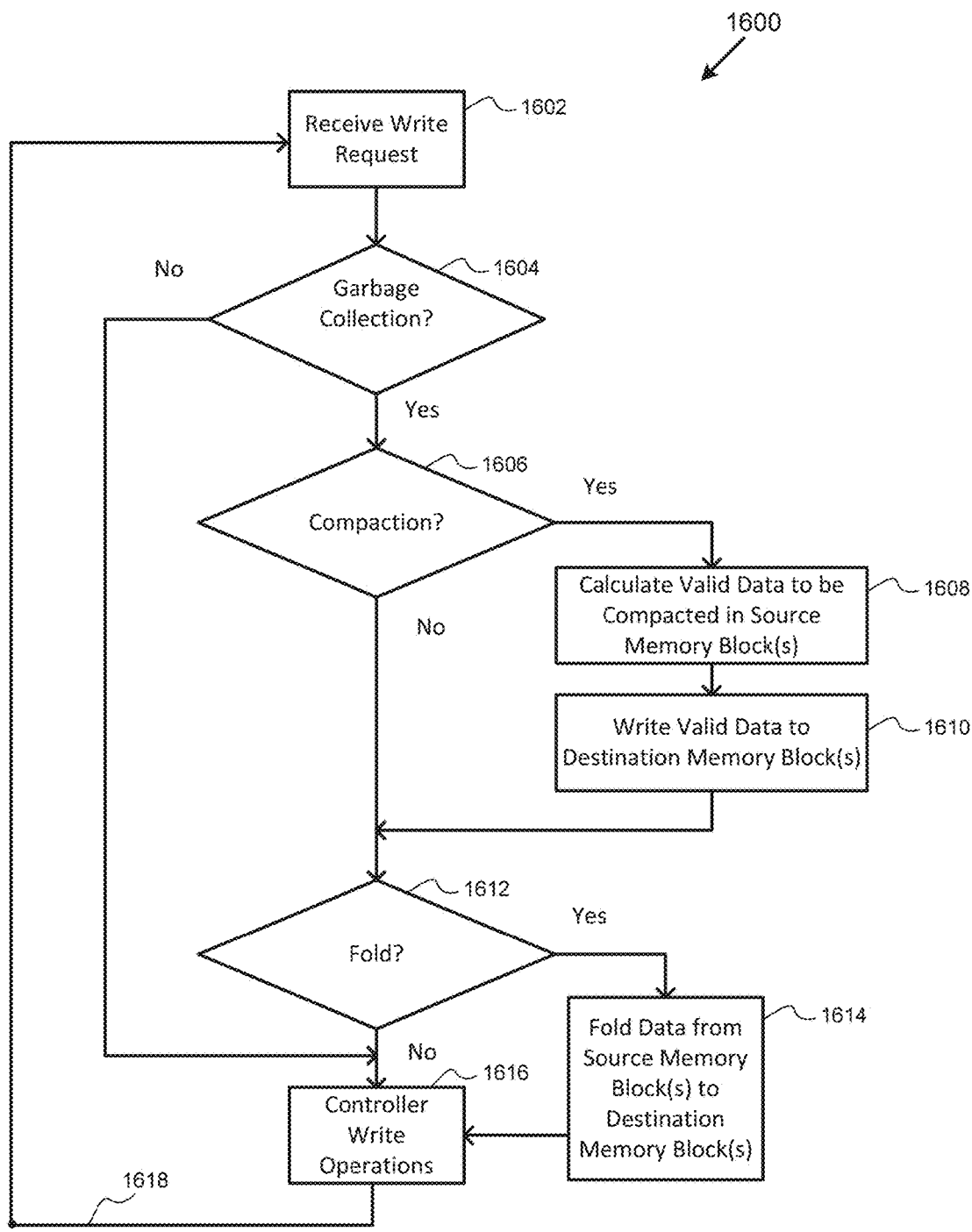
FIG. 16 is a schematic flow chart diagram illustrating another embodiment of a method for performing a GC/folding process.

With reference to FIG. 16, FIG. 16 is a schematic flow chart diagram illustrating another embodiment of a method 1600 for performing a GC/folding process. At least in the illustrated embodiment, the method 1600 begins by a controller (e.g., controller 126, 502A, 502B, 502C, 602, and 702, or the like) receiving an I/O request to write a data chunk (e.g., a write request) to a memory device (e.g., memory device 120, 120A, 120B, and 120C, or the like) (block 1602). In various embodiments, the controller may determine and/or detect the size of a write command associated with the write request and/or the data chunk included in the write command.

In response to the write request, the controller may determine whether a GC process and/or GC operations is/are to be performed (block 1604). In response to a "NO" determination, the controller may perform the write operations in accordance with the write request on the memory device (block 1616). In response to a "YES" determination, the controller may determine whether one or more compaction phases are to be performed (block 1606).

In response to a "YES" determination in block 1606, the controller may calculate an amount, quantity, and/or size of valid data and/or valid data chunks in one or more source memory blocks (e.g., memory blocks 508 and/or memory blocks 510) that are targeted by a GC component (e.g., GC component 150) based on equation (1) or equation (2) (block 1608). Here, the controller may determine and/or detect the size of the write request and/or the size of a data chunk in the write requests. Further, the controller may write the valid data and/or valid data chunks to one or more respective destination memory blocks memory blocks 508 and/or memory blocks 510 (block 1610).

Subsequent to the block 1610 or in response to a "NO" determination in block 1606, the controller may determine whether a folding process and/or folding operations is/are to be performed (block 1612). In response to a "NO" determination, the controller may perform the write request on the memory device (block 1616).

In response to a "YES" determination, the controller may write valid data and/or valid data fragments from one or more source memory blocks (e.g., memory block(s) 508) to one or more destination memory blocks (e.g., memory block(s) 510) as at least a portion of a folding process and/or folding operations (block 1614). The amount of valid data and/or valid data fragments written from the source memory block(s) to the destination memory block(s) may be calculated in accordance with equation (1) or equation (2). The controller may then perform the write request on the memory device (block 1616) and the method 1600 may then be repeated (return 1618).

Figure 17:
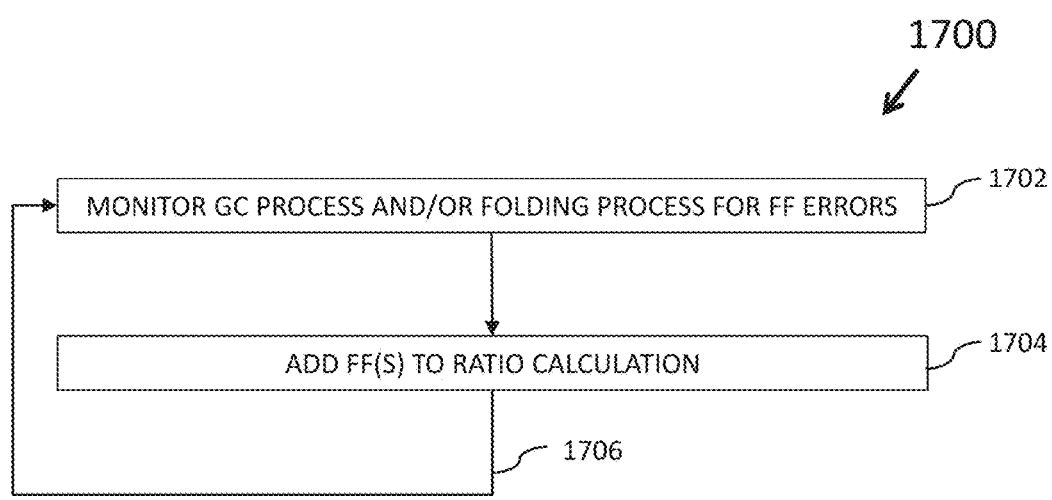
FIG. 17 is a schematic flow chart diagram illustrating one embodiment of a method for performing an error compensation process of a GC process and/or a folding process.

Referring to FIG. 17, FIG. 17 is a schematic flow chart diagram illustrating one embodiment of a method 1700 for performing an error compensation process of a GC process and/or folding process. At least in the illustrated embodiment, the method 1700 begins by a controller (e.g., controller 126, 502A, 502B, 502C, 602, and 702, or the like) monitoring a GC process/operations and/or folding process/ operations to detect a compaction error resulting in one or more FFs (block 1702).

In response to detecting the error, the controller may add the FF(s) to ratio equation (1) or ratio equation (2) in calculating the amount, quantity, and/or size of valid data and/or valid data chunks in one or more source memory blocks (e.g., memory blocks 508 and/or memory blocks 510) that are targeted by a GC component and/or one or more source memory blocks (e.g., memory blocks 508) that are targeted by a folding component 152 in the next iteration of a GC process/operations and/or folding process/operations (block 1704). That is, the controller may calculate the amount, quantity, and/or size of valid data and/or valid data chunks in block 1608 and/or block 1614 in accordance with ratio equation (1) or ratio equation (2). The controller may then return to block 1702 to continue monitoring the GC process/operations and/or folding process/operations (return 1706).

A means for dynamic compaction for a garbage collection process by a GC component 150, in various embodiments, may include one or more of a GC component 150, an ID circuit 802, a buffering circuit 804, an erasing circuit 806, a relocation circuit 808, a non-volatile memory device 120, a controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer-readable storage medium. Other embodiments may include similar or equivalent means for dynamic compaction for a garbage collection process by a GC component 150.

A means for dynamic compaction for a folding process by a folding component 152, in various embodiments, may include one or more of a folding component 152, an ID circuit 902, a buffering circuit 904, an erasing circuit 906, a relocation circuit 908, a non-volatile memory device 120, a controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer-readable storage medium. Other embodiments may include similar or equivalent means for dynamic compaction for a folding process by a folding component 152.

A means for dynamic compaction for a GC/folding process by a GC/folding component 1000, in various embodiments, may include one or more of a GC/folding component 1000, an ID circuit 802, a buffering circuit 804, an erasing circuit 806, a relocation circuit 808, an ID circuit 902, a buffering circuit 904, an erasing circuit 906, a relocation circuit 908, one or more ID circuits 1002, one or more buffering circuits 1004, one or more erasing circuits 1006, one or more relocation circuits 1008, a non-volatile memory device 120, a controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer-readable storage medium. Other embodiments may include similar or equivalent means for dynamic compaction for a GC/folding process by a GC/folding component 1000.

A means for generating an input/output (I/O) command to write a data chunk to a memory device, in various embodiments, may include one or more of a GC component 150, a folding component 152, an ID circuit 802, a buffering circuit 804, an erasing circuit 806, a relocation circuit 808, a non-volatile memory device 120, a controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer-readable storage medium. Other embodiments may include similar or equivalent means for generating an input/output (IO) command to write a data chunk to a memory device.

A means for determining a size of a data chunk, in various embodiments, may include one or more of a GC component 150, a folding component 152, an ID circuit 802, a buffering circuit 804, an erasing circuit 806, a relocation circuit 808, a non-volatile memory device 120, a controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer-readable storage medium. Other embodiments may include similar or equivalent means for determining a size of a data chunk.

A means for compacting an amount of valid data in a plurality of memory blocks of a memory device based on a size of a data chunk, in various embodiments, may include one or more of a GC component 150, a folding component 152, an ID circuit 802, a buffering circuit 804, an erasing circuit 806, a relocation circuit 808, a non-volatile memory device 120, a controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer-readable storage medium. Other embodiments may include similar or equivalent means for compacting an amount of valid data in a plurality of memory blocks of a memory device based on a size of a data chunk.

A means for accumulating a compacted amount of valid data and a second compacted amount of valid data to generate an accumulated amount of compacted valid data, in various embodiments, may include one or more of a GC component 150, a folding component 152, an ID circuit 802, a buffering circuit 804, an erasing circuit 806, a relocation circuit 808, a non-volatile memory device 120, a controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer-readable storage medium. Other embodiments may include similar or equivalent means for accumulating a compacted amount of valid data and a second compacted amount of valid data to generate an accumulated amount of compacted valid data.

A means for writing an accumulated amount of compacted valid data to a different memory block of a plurality of memory blocks, in various embodiments, may include one or more of a GC component 150, a folding component 152, an ID circuit 802, a buffering circuit 804, an erasing circuit 806, a relocation circuit 808, a non-volatile memory device 120, a controller 126, a non-volatile memory device interface 139, a host computing device 110, a device driver, a controller (e.g., a device driver, or the like) executing on a host computing device 110, a processor 111, an FPGA, an ASIC, other logic hardware, and/or other executable code stored on a computer-readable storage medium. Other embodiments may include similar or equivalent means for writing an accumulated amount of compacted data to a different memory block of a plurality of memory blocks.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus comprising:
a memory device comprising a plurality of memory blocks; and
a controller for the memory device, the controller configured to:
generate an input/output (I/O) command to write a data chunk to a first memory block of the plurality of memory blocks, and
compact a first amount of valid data stored in a second memory block of the plurality of memory blocks based on a size of the data chunk of the I/O command.

2. The apparatus of claim 1, wherein:
the first memory block and the second memory block each comprise single level cell (SLC) blocks; and
the I/O command comprises a write command to write new data to the memory device.

3. The apparatus of claim 1, wherein:
the controller is further configured to:
accumulate compacted valid data in a buffer, and
write the accumulated compacted valid data to a third memory block of the plurality of memory blocks;
the third memory block comprises a single level cell (SLC) block; and
compacting the valid data and writing the accumulated compacted data comprise at least a portion of a garbage collection process.

4. The apparatus of claim 1, wherein:
a third memory block in the plurality of memory block stores the data chunk;
the third memory block comprises a single level cell (SLC) block;
the first memory block comprises a multi-level cell (MLC) block storing two or more bits per cell; and
the I/O command comprises a fold command to write the first data chunk from an SLC block to an MLC block.

5. The apparatus of claim 1, wherein:
the controller is further configured to:
accumulate compacted valid data in a buffer, and
write the accumulated compacted valid data to a third memory block of the plurality of memory blocks;
the third memory block comprises an MLC block storing two or more bits per cell; and
compacting the valid data and writing the accumulated compacted data comprise at least a portion of a garbage collection process.

6. The apparatus of claim 1, wherein the first amount of valid data is one of:
less than the size of the data chunk of the I/O command; and
equal to the size of the data chunk of the I/O command.

7. The apparatus of claim 1, wherein the first amount of valid data is proportional to a size of the data chunk of the I/O command.

8. The apparatus of claim 1, wherein the controller is further configured to:
determine the size of the data chunk of the I/O command; and
calculate the first amount of valid data for compaction (AVDC1) in accordance with a ratio of valid fragments (VF) and total fragments (TF) in the first memory block multiplied by the size (S2) of the data chunk of the first I/O command such that $AVDC1=(VF/TF)*S2$.

9. The apparatus of claim 1, wherein the controller is further configured to:
determine a quantity of failed fragments in the first amount of valid data in response to detecting a compaction error when compacting the first amount of valid data;
generate a second I/O command to write a second data chunk to the memory device, determine a second size of the second I/O command; and
compact a second amount of valid data in the first memory block based on the second size of the second I/O command and the quantity of failed fragments.

10. The apparatus of claim 9, wherein the controller is further configured to calculate the second amount of valid data for compaction (AVDC2) in accordance with a ratio of valid fragments (VF) plus the quantity of failed fragments (FF) and total fragments (TF) in the first memory block multiplied by the second size (S2) of the second I/O command such that $AVDC2=[(VF+FF)/TF]*S2$.

11. A method comprising:
generating, by a controller, an input/output (I/O) command to write a data chunk to a first memory block of a plurality of memory blocks in a memory device; and
in response to the I/O command, performing a garbage collection process, wherein:
at least a compaction portion of the garbage collection process is based on a first size of the data chunk.

12. The method of claim 11, wherein the compaction portion of the garbage collection process compacts an amount of valid data in a set of memory blocks of the plurality of memory blocks based on the first size of the data chunk to generate a compacted amount of valid data.

13. The method of claim 12, wherein the garbage collection process further comprises:
accumulating the first compacted amount of valid data and a second compacted amount of valid data to generate an accumulated amount of compacted valid data; and
writing an amount of the accumulated amount of compacted valid data to a second memory block of the plurality of memory blocks,
wherein the amount of the accumulated amount of compacted valid data is based on a ratio of valid data to total data in the first memory block multiplied by the first size of the data chunk.

14. The method of claim 13, wherein:
the first memory block, the second memory block, and the set of memory blocks each comprise a single level cell (SLC) block; and
the I/O command is a write command to write new data to the memory device.

15. The method of claim 14, wherein:
the data chunk is stored in a third memory block of the plurality of memory blocks;
the third memory block comprises a single level cell (SLC) block;
the first memory block, the second memory block, and the set of memory blocks each comprise a multi-level cell (MLC) block storing two or more bits per cell; and
the amount of the accumulated amount of compacted valid data is written from a set of SLC blocks to an MLC block in response to a fold command.

16. The method of claim 12, wherein the amount of valid data (AVDC) is calculated in accordance with a ratio of valid fragments (VF) and total fragments (TF) in the set of memory blocks multiplied by the first size (S1) of the data chunk in the I/O command such that $AVDC=(VF/TF)*S1$.

17. The method of claim 12, further comprising:
determining a quantity of failed fragments (FF) in the compacted amount of valid data in response to detecting a compaction error when compacting the amount of valid data;
receiving a subsequent I/O command to write a subsequent data chunk to the memory device; and
determining a second size of the subsequent data chunk, wherein:
the compaction portion of the garbage collection process further comprises calculating a compensating amount of valid data (CAVDC) including a ratio of valid fragments (VF) plus FF and total fragments (TF) in the set of memory blocks multiplied by the second size (S2) of the subsequent data chunk in the subsequent I/O command such that CAVDC=[(VF+FF)/TF]*S2.

18. An apparatus comprising:
means for generating an input/output (I/O) command to write a data chunk to a memory device;
means for determining a size of the data chunk; and
means for compacting an amount of valid data in a plurality of memory blocks of the memory device based on the size of the data chunk.

19. The apparatus of claim 18, further comprising:
means for accumulating the compacted amount of valid data and a second compacted amount of valid data to generate an accumulated amount of compacted valid data; and
means for writing an amount of the accumulated amount of compacted valid data to a different memory block of the plurality of memory blocks,
wherein the amount of the accumulated amount of compacted valid data is based on a ratio of the valid data to a total amount of data in the plurality of memory blocks multiplied by the size of the data chunk.

20. The apparatus of claim 18, wherein the amount of valid data is one of:
proportional to a size of the data chunk of the I/O command;
less than the size of the data chunk of the I/O command; and
equal to the size of the data chunk of the I/O command.

21. An apparatus comprising:
a memory device comprising a plurality of memory blocks; and
a controller for the memory device, the controller configured to:
generate an input/output (I/O) command to write a data chunk to a first memory block of the plurality of memory blocks, and
write back an amount of valid data stored in a second memory block of the plurality of memory blocks to another memory block of the plurality of memory blocks that only stores valid data based on a size of the data chunk of the I/O command.

* * * * *